United States Patent
Park

(10) Patent No.: US 12,249,176 B2
(45) Date of Patent: Mar. 11, 2025

(54) ELECTRONIC DEVICE FOR PROVIDING HIGH ACCURACY BIO-SIGNALS BASED ON INFORMATION OBTAINED IN A NON-CONTACT MANNER, SYSTEM, AND OPERATION METHOD OF THE SAME

(71) Applicant: GB SOFT CO., LTD., Daegu (KR)

(72) Inventor: Ki Bum Park, Daegu (KR)

(73) Assignee: GB SOFT CO., LTD., Daegu (KR)

( * ) Notice: Subject to any disclaimer, the term of this patent is extended or adjusted under 35 U.S.C. 154(b) by 61 days.

(21) Appl. No.: 18/347,613

(22) Filed: Jul. 6, 2023

(65) Prior Publication Data
US 2024/0338965 A1 Oct. 10, 2024

(30) Foreign Application Priority Data
Apr. 4, 2023 (KR) .................. 10-2023-0043885

(51) Int. Cl.
*G06V 40/12* (2022.01)
*G06V 40/16* (2022.01)

(52) U.S. Cl.
CPC ........ *G06V 40/1365* (2022.01); *G06V 40/172* (2022.01)

(58) Field of Classification Search
CPC . G06N 20/00; G06N 3/02; G06N 3/08; G06F 30/27; G06F 1/163; G06F 3/013;
(Continued)

(56) References Cited

U.S. PATENT DOCUMENTS

2014/0073969 A1* 3/2014 Zou .................. A61B 5/346
600/479
2019/0038151 A1* 2/2019 Lee .................. G06T 7/0016
(Continued)

FOREIGN PATENT DOCUMENTS

| KR | 10-2019-0013319 A | 2/2019 |
| KR | 10-2020-0011818 A | 2/2020 |
| KR | 10-2020-0137830 A | 12/2020 |

OTHER PUBLICATIONS

Almarshad MA, Islam MS, Al-Ahmadi S, BaHammam AS. Diagnostic Features and Potential Applications of PPG Signal in Healthcare: A Systematic Review. Healthcare (Basel). Mar. 16, 2022;10(3):547. doi: 10.3390/healthcare10030547. PMID: 35327025; PMCID: PMC8950880. (Year: 2022).*
(Continued)

*Primary Examiner* — Ian L Lemieux
(74) *Attorney, Agent, or Firm* — WTA Patents

(57) ABSTRACT

According to various embodiments, an electronic device may include a first communication circuit and at least one first processor. At least one first processor is configured to: obtain, via the communication circuit, a plurality of images including a user's face obtained by using a camera of a first external electronic device; obtain first data obtained based on a first sensor of the first external electronic device contacted with a first portion of a body of the user and second data obtained based on a second external electronic device contacting a second portion of the body of the user while obtaining the plurality of images, while simultaneously acquiring the plurality of images; and obtain a first biometric signal of a specific type based on the images, a second biometric signal of the specific type based on the first data, and a third biometric signal based on the second data.

7 Claims, 30 Drawing Sheets

(58) Field of Classification Search
CPC .............. G16H 50/20; G16H 40/67; G02B 2027/0138; G02B 27/0093; G06T 2207/20081; G06T 2207/30196; G06T 2207/30088; G06T 2207/30076; G06T 2207/30104; G06T 2207/30201; A61B 5/0205; A61B 5/0295; A61B 5/1455; A61B 5/681; A61B 5/02416; A61B 5/024; A61B 5/02405; A61B 5/1176; A61B 5/0006; A61B 5/0531; A61B 5/1128; G06V 10/82; G06V 40/15; G06V 40/70; G06V 40/117

See application file for complete search history.

(56) References Cited

U.S. PATENT DOCUMENTS

| | | |
|---|---|---|
| 2020/0034739 A1 | 1/2020 | Chung et al. |
| 2020/0085312 A1* | 3/2020 | Tzvieli .............. A61B 5/02055 |
| 2020/0260956 A1* | 8/2020 | Lee .......................... G06F 9/54 |
| 2022/0249027 A1 | 8/2022 | Chung |
| 2022/0296105 A1* | 9/2022 | Drakos ................ A61B 5/0215 |
| 2023/0000377 A1* | 1/2023 | Wu ........................ G06V 40/15 |
| 2023/0036114 A1* | 2/2023 | Whitehill ............... A61B 5/742 |
| 2023/0060676 A1* | 3/2023 | Darling ................ G06V 10/803 |
| 2023/0200664 A1* | 6/2023 | Peters ...................... A61B 5/26 |
| | | 600/301 |
| 2023/0229246 A1* | 7/2023 | Gerhard ................. G06F 3/013 |
| | | 715/700 |

OTHER PUBLICATIONS

Scardulla F, D'Acquisto L, Colombarini R, Hu S, Pasta S, Bellavia D. A Study on the Effect of Contact Pressure during Physical Activity on Photoplethysmographic Heart Rate Measurements. Sensors (Basel). Sep. 5, 2020;20(18):5052. doi: 10.3390/s20185052. PMID: 32899540; PMCID: PMC7570982. (Year: 2020).*

* cited by examiner

FIG. 2
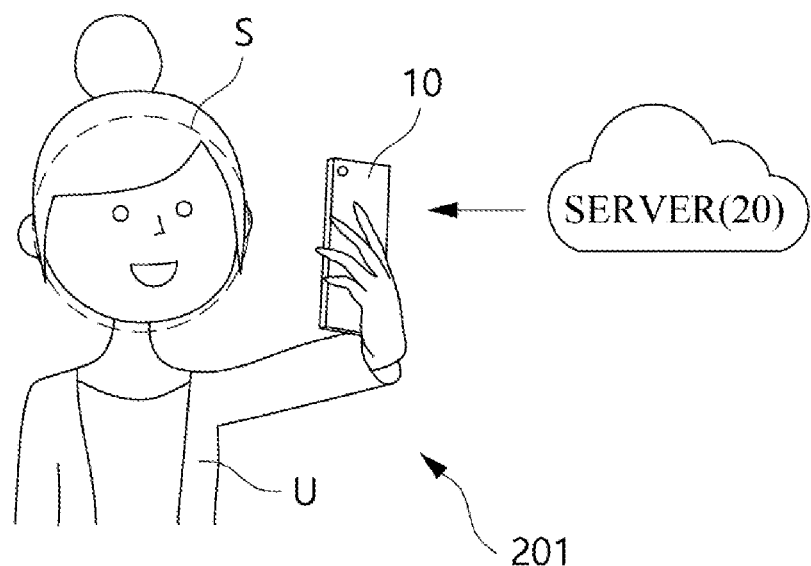
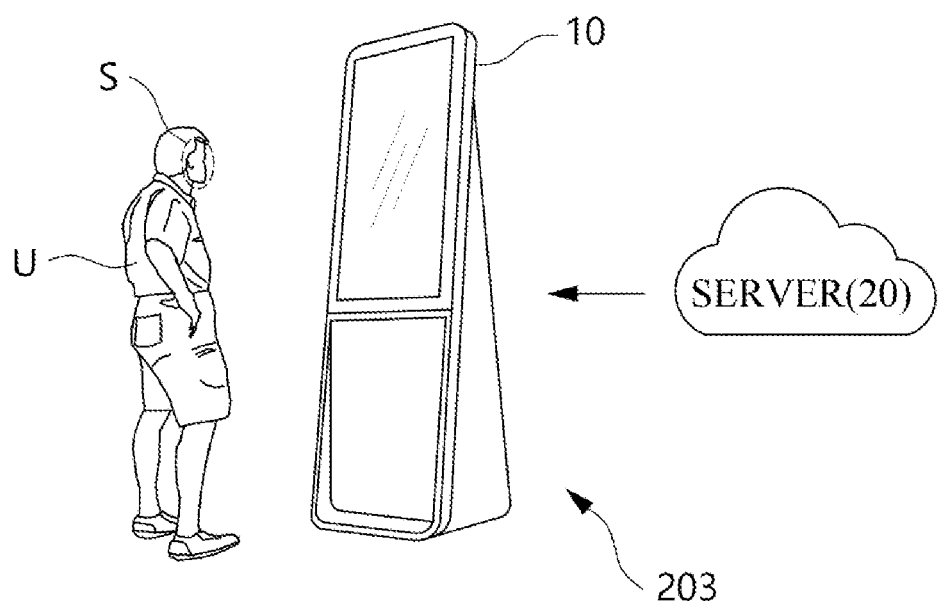

FIG. 9
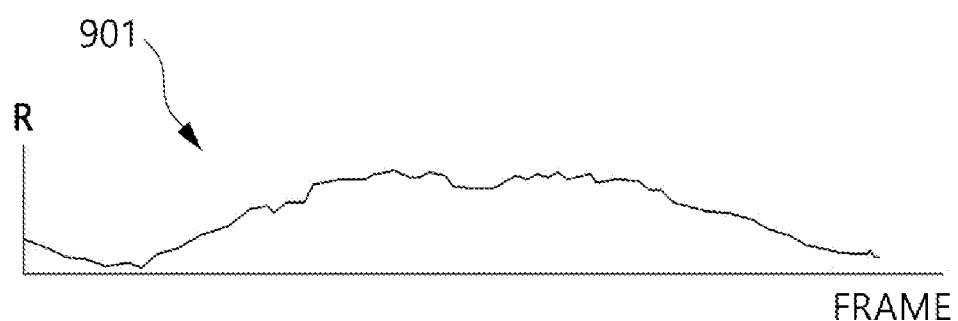
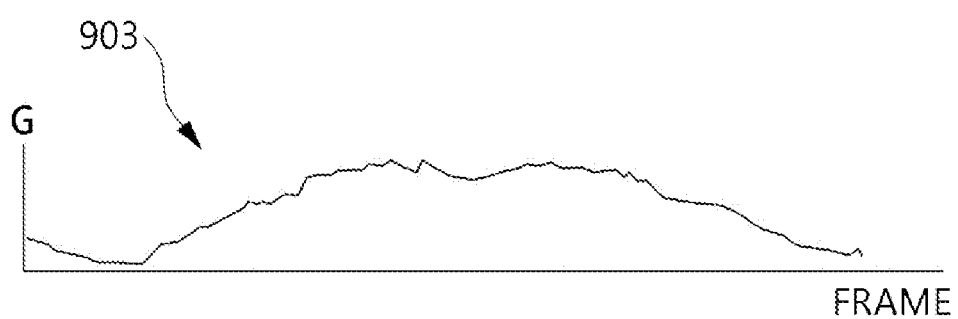
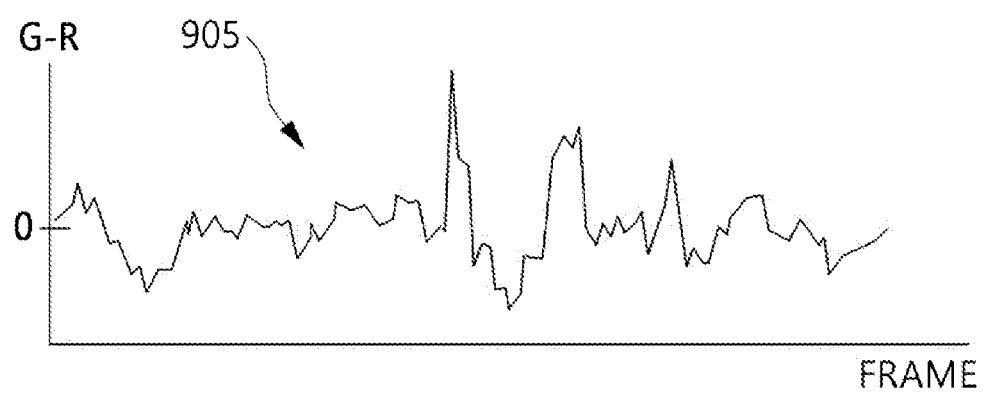

FIG. 13
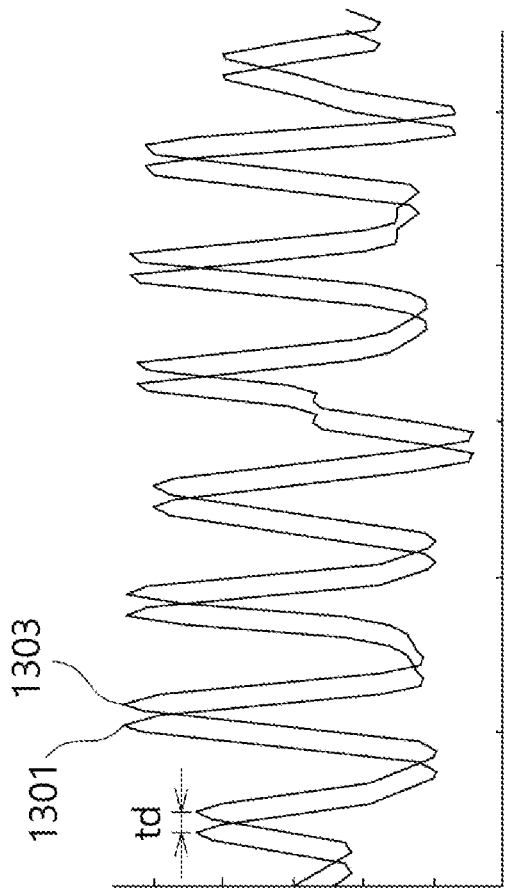
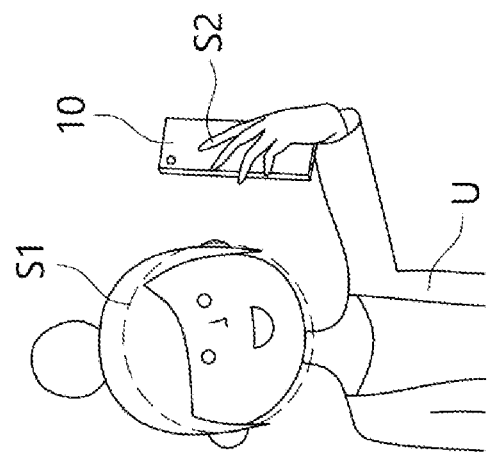

ELECTRONIC DEVICE FOR PROVIDING HIGH ACCURACY BIO-SIGNALS BASED ON INFORMATION OBTAINED IN A NON-CONTACT MANNER, SYSTEM, AND OPERATION METHOD OF THE SAME

CROSS-REFERENCE TO RELATED APPLICATIONS

This application is Korean Patent Application No. 10-2023-0043885 filed Apr. 4, 2023, the disclosure of which is herein incorporated by reference in its entirety.

BACKGROUND

1. Field

Various embodiments of the present disclosure relate to an electronic device for providing bio-signals with high accuracy based on information acquired in a non-contact method, a server, a system, and an operating method of the same.

2. Description of Related Art

The most common technique for measuring photoplethysmography (PPG) using light is to analyze the amount of transmitted light relative to the light irradiated to the human body, and it is known that the absorbance is proportional to the concentration of the absorbing material and the thickness of the absorbing layer. It is explained by the Beer-Lambert law. According to this law, the change in transmitted light results in a signal proportional to the change in the volume of the transmitted material, so even when the absorbance of the material is not known, it is possible to determine the state of the heart using PPG.

Recently, a technology using remote photoplethysmography (rPPG) has emerged, going one step further from a technology using PPG. This is the most popular technology that uses PPG to identify signals related to heartbeat. A technology that directly contacts the human body with a device that has a camera and light attached to it, such as a smartphone, irradiates light and immediately measures transmitted light to obtain PPG. If there is, recently, a technology related to rPPG (remote photoplethysmography) that detects a change in the volume of a blood vessel from a signal obtained from an image taken with a camera is being continuously researched and developed.

Since the technology using rPPG does not require contact between the subject and the measurement equipment, it can be applied in a variety of places and devices equipped with cameras, such as airport immigration offices and telemedicine.

However, rPPG technology extracts only the signal related to the volume change of the measurement object from the captured image because noise generated by ambient light and movement of the object has a great effect on the signal in the process of photographing the object with a camera. It can be seen as a core technology among technologies that measure bio-signals using rPPG.

SUMMARY

Remote photoplethysmography (rPPG) has low accuracy compared to PPG obtained using a contact type sensor.

According to various embodiments, an electronic device, server, system, and operation method may be provided to provide information on a bio-signal having accuracy corresponding to a bio-signal acquired in a contact method based on information acquired in a noncontact method.

According to various embodiments, an electronic device may include a first communication circuit and at least one first processor, wherein the at least one first processor is configured to: obtain, via the communication circuit, a plurality of images including a user's face obtained by using a camera of a first external electronic device; obtain, via the communication circuit, first data obtained based on a first sensor of the first external electronic device contacted with a first portion of a body of the user and second data obtained based on a second external electronic device contacted with a second portion of the body of the user while obtaining the plurality of images, while simultaneously acquiring the plurality of images; and obtain a first biometric signal of a specific type based on the plurality of images, a second biometric signal of the specific type based on the first data, and a third biometric signal based on the second data.

According to various embodiments, there may be provided an operation method of an electronic device, the operation method including: acquiring, via the communication circuit, a plurality of images including a user's face acquired by using a camera of a first external electronic device; while acquiring the plurality of images, acquiring, via the communication circuit, first data acquired based on a first sensor of the first external electronic device contacting a first portion of a body of the user and second data acquired based on a second external electronic device contacting a second portion of the body of the user at the same time; and acquiring a first biometric signal of a specific type based on the plurality of images, a second biometric signal of the specific type based on the first data, and a third biometric signal based on the second data.

According to various embodiments, an electronic device, a server, a system, and an operating method may provide information about a bio-signal, based on information obtained in a noncontact method, having an accuracy corresponding to an accuracy of a bio-signal acquired in a contact method.

The problem to be solved by the present invention is not limited to the problems mentioned above, and other problems not mentioned will be clearly understood by those skilled in the art from the description below.

BRIEF DESCRIPTION OF THE DRAWINGS

FIG. 2 is a view for explaining an example of an electronic device according to various embodiments.

FIG. 9 is a view for explaining an example of an operation of obtaining a difference value between color channels, according to various embodiments.

FIG. 13 is a view for describing examples of bio-signals, according to various embodiments.

DETAILED DESCRIPTION

Figure 1:
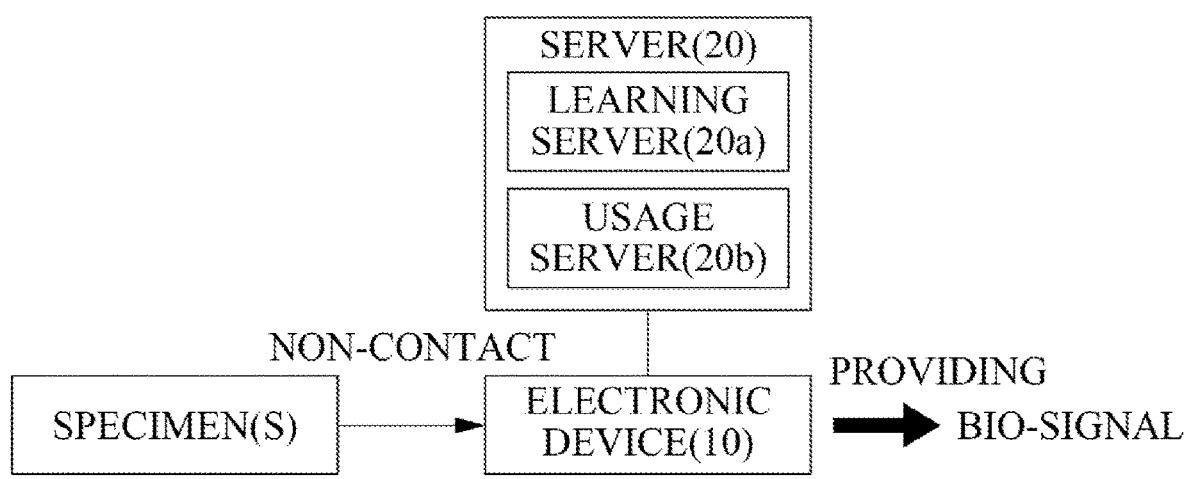
FIG. 1 is a view for explaining an example of a configuration of a bio-signal measurement system according to various embodiments.

According to various embodiments, an electronic device disclosed in this document may be devices of various types. The electronic device may include, for example, a portable communication device (e.g., a smart phone), a computer device, a portable multimedia device, a portable medical device, a camera, a wearable device, or a home appliance. An electronic device according to an embodiment of the present document is not limited to the aforementioned devices.

Various embodiments of this document and terms used therein are not intended to limit the technical features described in this document to specific embodiments, but should be understood to include various modifications, equivalents, or substitutes of the embodiments. In connection with the description of the drawings, like reference numbers may be used for like or related elements. The singular form of a noun corresponding to an item may include one item or a plurality of items, unless the relevant context clearly dictates otherwise. In this document, "A or B", "at least one of A and B", "at least one of A or B", "A, B or C", "at least one of A, B and C", and "A Each of the phrases such as "at least one of, B, or C" may include any one of the items listed together in that phrase, or all possible combinations thereof. Terms such as "first", "second", or "first" or "secondary" may simply be used to distinguish that component from other corresponding components, and may refer to that component in other respects (e.g., importance or order) is not limited. A (e.g., first) component is said to be "coupled" or "connected" to another (e.g., second) component, with or without the terms "functionally" or "communicatively." When mentioned, it means that the certain component may be connected to the other component directly (e.g., by wire), wirelessly, or through a third component.

The term "module" used in various embodiments of this document may include a unit implemented in hardware, software, or firmware, and is interchangeable with terms such as, for example, logic, logical blocks, parts, or circuits. can be used as A module may be an integrally constructed component or a minimal unit of components or a portion thereof that performs one or more functions. For example, according to one embodiment, the module may be implemented in the form of an application-specific integrated circuit (ASIC).

Various embodiments of this document can be implemented as software (e.g., a program) including one or more instructions stored in a storage medium (e.g., internal memory) or external memory readable by a machine (e.g., an electronic device). For example, a processor (e.g., a processor) of a device (e.g., an electronic device) may call at least one command among one or more instructions stored from a storage medium and execute it. This enables the device to be operated to perform at least one function according to the at least one command invoked. The one or more instructions may include code generated by a compiler or code executable by an interpreter. The device-readable storage medium may be provided in the form of a non-transitory storage medium. Hereinafter, 'non-temporary' means that the storage medium is a tangible device and does not contain signals (e.g., electromagnetic waves), and this term refers to the case where data is stored semi-permanently and temporarily stored in the storage medium.

According to one embodiment, the method according to various embodiments disclosed in this document may be provided by being included in a computer program product. Computer program products may be traded between sellers and buyers as commodities. Computer program products are distributed in the form of a storage medium readable by a device (e.g. compact disc read only memory (CD-ROM)) or through an application store or directly between two user devices (e.g., smart phones), online distribution (e.g., download or upload). In the case of online distribution, at least part of the computer program product may be temporarily stored or temporarily created in a device-readable storage medium such as a manufacturer's server, an application store server, or a relay server's memory.

According to various embodiments, each component (e.g., module or program) of the above-described components may include a single object or a plurality of entities, and some of the plurality of entities may be separately disposed in other components. According to various embodiments, one or more components or operations among the aforementioned corresponding components may be omitted, or one or more other components or operations may be added. Alternatively or additionally, a plurality of components (e.g., modules or programs) may be integrated into a single component. In this case, the integrated component may perform one or more functions of each of the plurality of components identically or similarly to those performed by a corresponding component of the plurality of components prior to the integration. According to various embodiments, the actions performed by a module, program, or other component are executed sequentially, in parallel, iteratively, or heuristically, or one or more of the actions are executed in a different order, or omitted. or one or more other actions may be added.

According to various embodiments, an electronic device may include a first communication circuit and at least one first processor, wherein the at least one first processor is configured to: obtain, via the communication circuit, a plurality of images including a user's face obtained by using a camera of a first external electronic device; obtain, via the communication circuit, first data obtained based on a first sensor of the first external electronic device contacted with a first portion of a body of the user and second data obtained based on a second external electronic device contacted with a second portion of the body of the user while obtaining the plurality of images, while simultaneously acquiring the plurality of images; and obtain a first biometric signal of a specific type based on the plurality of images, a second biometric signal of the specific type based on the first data, and a third biometric signal based on the second data.

According to various embodiments, the at least one processor may further include a camera configured to capture the images of the first external electronic device, which is acquired by the second sensor of the first external electronic device, while the plurality of images are acquired through the communication circuit.

According to various embodiments, an electronic device may be provided, wherein the photographing information associated with the photographing of the electronic device includes information associated with a state associated with the photographing of the first external electronic device and information associated with an external environment of the first external electronic device.

According to various embodiments, the at least one processor may be provided with an electronic device configured to further obtain personal information associated with a personal characteristic of the user of the first external electronic device through the communication circuit.

According to various embodiments, the at least one processor may be configured to generate at least one artificial intelligence model by performing learning based on at least a part of the first biometric signal, the second biometric signal, the third biometric signal, the photographing information, or the personal information, and the at least one artificial intelligence model may be implemented to provide a value for the specific type of biometric signal sensed in a contact type.

According to various embodiments, an electronic device may be provided in which the at least one artificial intelligence model is configured to output the third biometric signal based on receiving at least a part of the first biometric signal, the second biometric signal, the photographing information, or the personal information.

According to various embodiments, the at least one processor may be configured to perform time synchronization of the first biometric signal, the second biometric signal, and the third biometric signal.

According to various embodiments, the at least one processor may be configured to select the first biometric signal associated with the face closest to the heart among the first biometric signal, the second biometric signal, and the third biometric signal based on the first biometric signal, and synchronize each of the remaining second biometric signal and the second biometric signal with the first biometric signal based on the selected first biometric signal.

According to various embodiments, the at least one processor may be configured to generate the at least one AI model in a state in which time synchronization with respect to the first biometric signal, the second biometric signal, and the third biometric signal is not performed.

According to various embodiments, there may be provided an operation method of an electronic device, the operation method including: acquiring, via the communication circuit, a plurality of images including a user's face acquired by using a camera of a first external electronic device; while acquiring the plurality of images, acquiring, via the communication circuit, first data acquired based on a first sensor of the first external electronic device contacting a first portion of a body of the user and second data acquired based on a second external electronic device contacting a second portion of the body of the user at the same time; and acquiring a first biometric signal of a specific type based on the plurality of images, a second biometric signal of the specific type based on the first data, and a third biometric signal based on the second data.

According to various embodiments, there may be provided an operation method further including: acquiring information associated with a photographing of the first external electronic device acquired by a second sensor of the first external electronic device while acquiring the plurality of images via the communication circuit.

According to various embodiments, there may be provided an operation method in which the photographing information associated with the photographing of the electronic device includes information associated with a state associated with the photographing of the first external electronic device and information associated with an external environment of the first external electronic device.

According to various embodiments, there may be provided an operation method further including: acquiring, via the communication circuit, personal information associated with a personal characteristic of the user of the first external electronic device.

According to various embodiments, there may be provided an operation method further including: generating at least one artificial intelligence model by performing learning based on at least some of the first biometric signal, the second biometric signal, the third biometric signal, the photographing information, or the personal information, wherein the at least one artificial intelligence model is implemented to provide a value for the specific type of biometric signal sensed in a contact manner.

According to various embodiments, there may be provided an operation method in which the at least one artificial intelligence model is implemented to output the third biometric signal based on receiving at least some of the first biometric signal, the second biometric signal, the photographing information, or the personal information.

Hereinafter, according to various embodiments, a bio-signal measurement system 1 will be described.

According to various embodiments, the bio-signal measurement system 1 is configured to provide information related to a bio-signal obtained based on an analysis of a user and/or an object (e.g., the user's body part such as a face) in a non-contact method. The bio-signal includes a pulse wave (photoplethysmography, PPG), oxygen saturation (SPO2), heart rate variability (HRV), electrocardiogram (ECG), electroencephalogram (EEG), electromyogram (EMG), galvanic skin conductance GSR) and skin temperature (SKT), but the bio-signal is not limited to the described example and may further include various types of bio-signals. The bio-signal measurement system 1 may collect a plurality of bio-signals of a specific type at the same time based on a non-contact method and a contact method with higher accuracy than the non-contact method in order to improve the accuracy of the bio-signal obtained in the non-contact method, and use an artificial intelligence (AI) model that is learned based on the plurality of the collected bio-signals. Specific embodiments will be described below.

FIG. 1 is a view for explaining an example of a configuration of a bio-signal measurement system 1 according to various embodiments. Hereinafter, the operations of FIG. 1 will be described with reference to FIG. 2.

FIG. 2 is a view for explaining an example of an electronic device 10 according to various embodiments.

According to various embodiments, referring to FIG. 1, the biological signal measurement system 1 may include an electronic device 10 and a server 20. However, the biological signal measurement system 1 is not limited to the illustrated and/or described examples, and the biological signal measurement system 1 may be configured to include more devices.

According to various embodiments, the electronic device 10 may be an electronic device of a user who wants to measure a biological signal (e.g., remote photoplethysmography, rPPG) in a non-contact method using the biological signal measurement system 1. For example, the electronic device 200 includes a user terminal such as a smartphone, a wearable device, a head mounted display (HMD) device like as shown in 201 of FIG. 2, and a user device used in an installed and/or arranged form such as a kiosk, a smart mirror, and the like, as shown in 203 of FIG. 2. The electronic device 10 may be configured to detect the specimen S in a non-contact method and provide a bio-signal based on an result of the detection. For example, as shown in FIG. 2, the electronic device 10 may capture a plurality of images (or a video, or a single image) based on photographing the object S (e.g., the face of the user U), receive bio-signals (e.g., PPG) corresponding to the plurality of images from the server 20, and provide the received bio-signals in a form recognizable to a user (e.g., displaying on a display of the electronic device 10, and/or outputting in the form of sound through a speaker of the electronic device 10).

According to various embodiments, the specimen S may be a face of the user for measuring PPG, a chest of the user for measuring respiratory rate, but not limited to the aforementioned examples, the specimen S may be various body parts of the user.

According to various embodiments, the server 20 may acquire a bio-signal based on the specimen S detected in a non-contact method, and provide information on the obtained bio-signal to the electronic device 10. For example, the server 20 may include a learning server 20a and a usage server 20b. However, it is not limited to the illustrated and/or described examples, and the server 20 may be implemented as a single server that performs both the functions of the learning server 20a and the function of the usage server 20b. The learning server 20a may generate at least one artificial intelligence model that is learned to provide bio-signals. For example, the learning server 20a may generate an artificial intelligence model configured to output bio-signals with accuracy similar to that of the contact detection method, in response to receiving the bio-signal based on the specimen S detected in a non-contact method and at least one piece of information different from the bio-signal in the non-contact method. The artificial intelligence model learned by the learning server 20a may be provided to the usage server 20b. The usage server 20b may establish a communication connection with the electronic device 10, and receive information about the specimen S obtained by the electronic device 10 in a non-contact method from the electronic device 10. The usage server 20b may input the information about the specimen S to the artificial intelligence model, obtain information about a bio-signal output from the artificial intelligence model, and may transmits information about the obtained bio-signal to the electronic device 10.

Meanwhile, the present example is not limited, and the electronic device 10 may be implemented in an on-device form so that the electronic device 10 can provide a bio-signal without the operation of the server 20.

Hereinafter, examples of configurations of the electronic device 10 and the server 20 according to various embodiments will be described.

Figure 3:
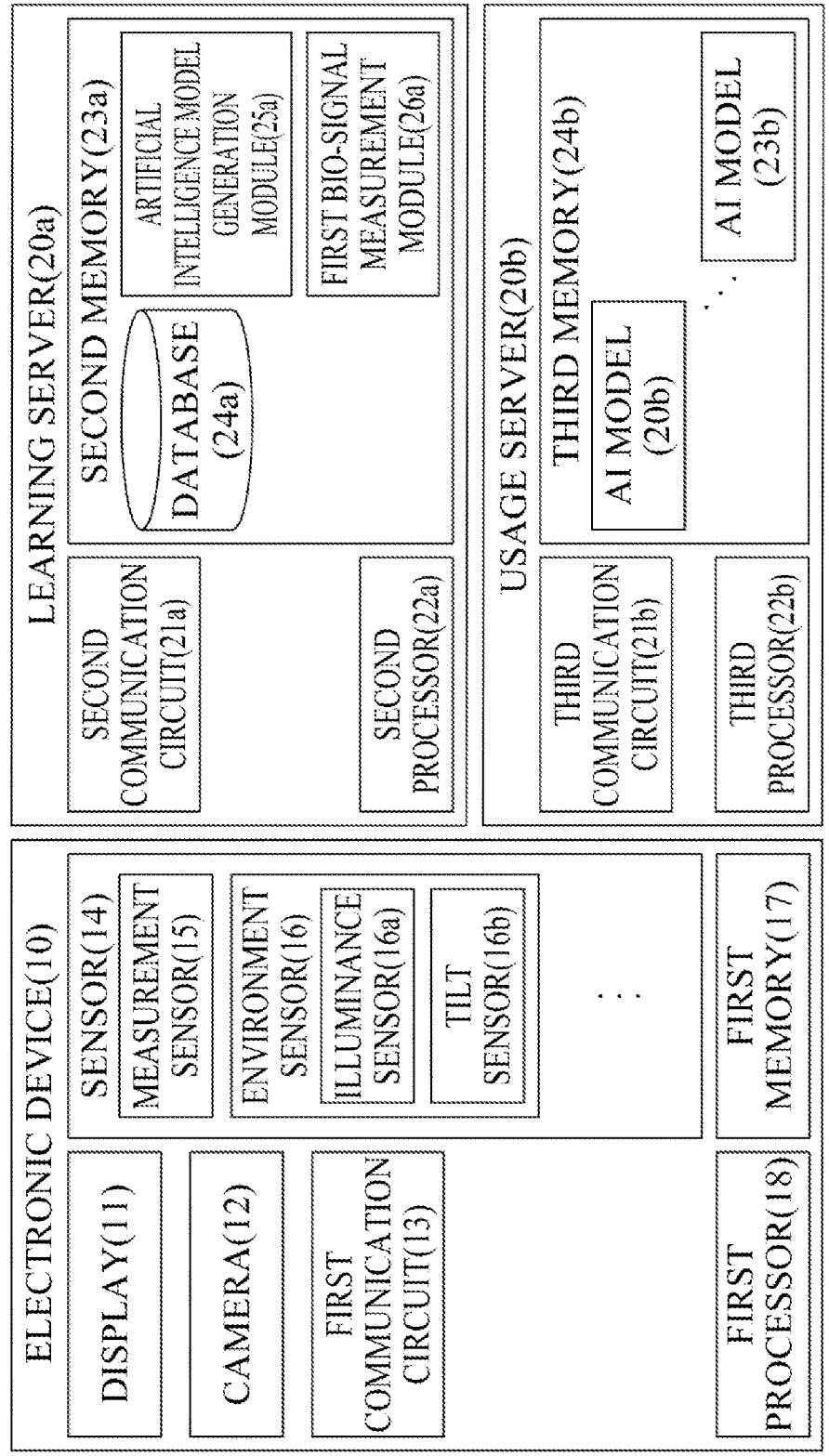
FIG. 3 is a view for explaining an example of a configuration of an electronic device and a server (e.g., a learning server and a usage server) according to various embodiments.

FIG. 3 is a view for explaining an example of a configuration of an electronic device 10 and a server 20 (e.g., a learning server 20a and a usage server 20b) according to various embodiments. 3, at least one of these components is omitted from the electronic device 20 and the server 20, or one or more other components are included in the electronic device 20 and the server 20. In some embodiments, some of these components may be implemented as an integrated circuit. Hereinafter, the operations of FIG. 3 will be further described with reference to FIG. 4.

Figure 4:
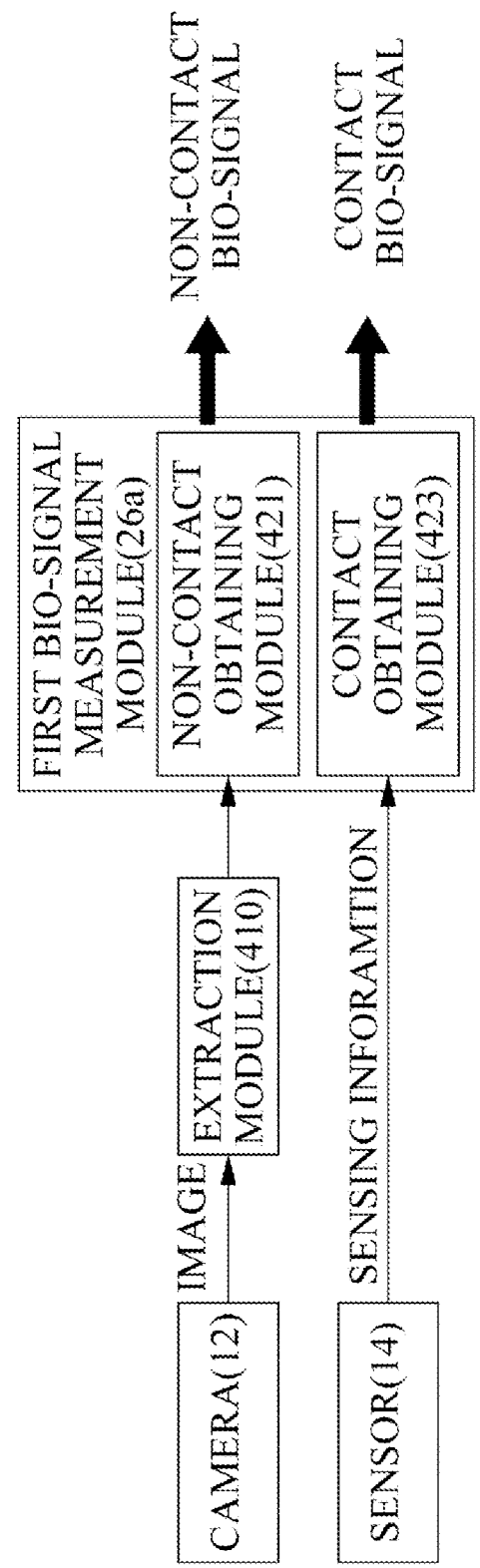
FIG. 4 is a view for explaining an example of a bio-signal measurement module, according to various embodiments.

FIG. 4 is a view for explaining an example of a bio-signal measurement module, according to various embodiments.

Hereinafter, an example of a configuration of the electronic device 10 according to various embodiments will be described.

According to various embodiments, the electronic device 10 may include a display 11, a camera 12, a first communication circuit 13, a sensor 14, a first memory 17, and a first processor 18. Meanwhile, without being limited to the illustrated and/or described examples, the electronic device 10 may be configured to further include various electronic components (e.g., speakers) and devices provided in the user terminal, and/or include fewer components. Hereinafter, examples of each configuration will be described.

According to various embodiments, the display 11 may visually provide information to the outside of the electronic device 200 (e.g., a user). For example, the display 11 may include a display, a hologram device, and/or a projector, and a control circuit for controlling the corresponding device. According to an embodiment, the display 11 may include a touch circuitry configured to detect a touch or a sensor circuit (e.g., a pressure sensor) configured to measure the intensity of force generated by the touch.

According to various embodiments, the camera 12 may include an image sensor for photographing.

According to various embodiments, the first communication circuit 13 may support establishment of a wireless communication channel between the electronic device 10 and an external electronic device (e.g., the server 20), and communication between the electronic device 10 and the external electronic device through the established communication channel. there is. The first communication circuit 13 may include one or more communication processors that operate independently of the first processor 18 and support wireless communication.

According to various embodiments, the sensor 14 may include a measurement sensor 15 for obtaining (or sensing) a bio-signal in a contact-type manner, and an environment sensor 16 for obtaining (or sensing) various types of information (photography information) related to photography.

For example, the measurement sensor 15 may include a PPG sensor, a SPO2 sensor, an HRV sensor, an ECG sensor, an EEG sensor, an EMG sensor, a GSR sensor, and/or an SKT sensor, but without being limited to the examples described, the measurement sensor 15 may further include various types of sensors. As an example, the PPG sensor may be a sensor configured to measure a PPG signal based on a change of a dimming amount of received light which is emitted from the user's skin while the PPG sensor is in contact with the skin.

For example, the environmental sensor 16 may include a first environmental sensor (e.g., an illuminance sensor 16A) for measuring information related to a photographed surrounding environment (e.g., light intensity, illuminance, temperature, etc.), and a second environmental sensor (e.g., tilt sensor 16b, motion sensors (not shown), etc.) for measuring information related to a state (e.g., tilt, motion, position, height, direction) of the electronic device 10 during capturing. Information obtained by the environmental sensor 16 may be defined as data. At least some of the information obtained by the environmental sensor 16 may be obtained by an analysis module (not shown) for analyzing an image captured by the camera 12, not by the environmental sensor 16. For example, the analysis module (not shown) may identify the amount of light, illuminance, and the like based on a pixel value (e.g., a brightness value) of an image.

According to various embodiments, the first memory 17 may store various data used by at least one component (e.g., the first processor 18) of the electronic device 210. For example, the first memory 17 may store a predetermined application. Based on the execution of the application, an operation of the electronic device 10 described below may be performed.

According to various embodiments, the application of the electronic device 10 may be configured to obtain additional information. For example, the additional information may include personal information such as the user's gender, age, age, race, BMI index, camera information on parameters (e.g., focal length, etc.) of the camera 12, photographing information indicating shooting conditions such as resolution and frames per second (FPS), and distance to the subject, etc., and image information indicating characteristics that can be analyzed from an image (or video) (e.g., direction of light shining on a specimen (e.g., forward light, backlight)). In this case, some of the additional information (e.g., BMI index) may be obtained based on an artificial intelligence model for calculating the some of the additional information.

According to various embodiments, the first processor 18 may, for example, execute software to control at least one other component (e.g., hardware or software configuration) of the electronic device 200 connected to the first processor 520 and perform various data processing or calculations. According to one embodiment, as at least part of data processing or calculation, the first processor 520 may load instructions or data from other components (e.g., the second communication circuit 540 or the third communication circuit 550) into volatile memory, process commands or data stored in the volatile memory, and store resulting data in the non-volatile memory. According to one embodiment, the first processor 520 may include a main processor (e.g., a central processing unit or an application processor), and a secondary processor (e.g., a graphic processing unit, an image signal processor, a sensor hub processor, or a communication processor) that may operate independently or together with the main processor. Additionally or alternatively, the secondary processor may be configured to use less power than the main processor or to be specialized for a designated function. The secondary processor may be implemented separately from, or as part of, the main processor.

Hereinafter, an example of a configuration of the server 20 according to various embodiments will be described.

According to various embodiments, the learning server 20a may include a second communication circuit 21a, a second processor 22a, and a memory 23a. Because the second communication circuit 21a may be implemented like the aforementioned first communication circuit 13, the second processor 22a may be implemented like the aforementioned first processor 18, and the second memory 23a may be implemented the aforementioned first memory 17, redundant description is omitted. Meanwhile, without being limited to the illustrated and/or described examples, the learning server 20a may be configured to include more components, and/or fewer components. Below, examples of each configuration will be described.

According to various embodiments, the memory 23a may include a database 24a, an artificial intelligence model generation module 25a, and a first bio-signal measurement module 26a. The modules 25a and 26a are implemented in the form of computer readable computer codes, programs, software, applications, APIs, and/or instructions, and learning is performed based on the execution of the modules 25a and 26a. The second processor 22a of the server 20a may be triggered to perform a specific operation.

According to various embodiments, the database 24a may be configured to accumulate various types of information for generating an artificial intelligence model. For example, the database 24a may store bio-signals measured in a non-contact method obtained by the first bio-signal measurement module 26a described later, bio-signals measured in a contact method corresponding thereto, and environment data measured by the sensor 16 and additional information. As described above, the additional information may include personal information, camera information, photographing information, and/or image information.

According to various embodiments, the artificial intelligence model generating module 25a may generate an artificial intelligence model capable of providing bio-signals having accuracy similar to (or close to) accuracy of a bio-signal (e.g., PPG) measured in a contact method based on a bio-signal (e.g., rPPG) measured in a non-contact method. An example of learning operations for the artificial intelligence model will be described in detail later.

According to various embodiments, the first bio-signal measurement module 26a may be configured to measure a non-contact bio-signal and a contact bio-signal based on information received from the electronic device 10. For example, as shown in FIG. 4, the first bio-signal measurement module 26a may include a non-contact obtaining module 421 for obtaining a bio-signal (e.g., non-contact bio-signal) based on information collected in the non-contact method (e.g., a plurality of images including the specimen S photographed by the camera 12) and a contact obtaining module 423 for obtaining a contact bio-signal based on information collected in a contact method (e.g., sensing information collected from the sensor 14).

Meanwhile, without being limited to the described example, at least some of the components (e.g., the database 24a, the artificial intelligence model generation module 25a, and the first bio-signal measurement module 26a) may be implemented in the electronic device 10. For example, when the first bio-signal measurement module 26a may be implemented in the electronic device 10, the electronic device 10 may obtain a non-contact bio-signal and a contact bio-signal, and transmit the plurality of bio-signals to the learning server 20a cause to learn the artificial intelligence model based on the plurality of bio-signals.

According to various embodiments, the usage server 20b may include a third communication circuit 21b, a third processor 22b, and a third memory 24b. Because the third communication circuit 21b may be implemented like the aforementioned first communication circuit 13, the third processor 22b may be implemented like the aforementioned first processor 18, and the third memory 24b may be implemented like the aforementioned first memory, redundant description is omitted. On the other hand, without being limited to the illustrated and/or described examples, the usage server 20b may be implemented to include more components and/or fewer components. Below, examples of each configuration will be described.

According to various embodiments, the third memory 24b may store at least one artificial intelligence model 23b, 23c that has been learned by the learning server 20a (e.g., the artificial intelligence model generation module 25a), and the second bio-signal measurement module 24b same as the afore-mentioned first bio-signal measurement module 26a. The usage server 20b may obtain a specific type of bio-signal based on the plurality of images about the specimen S detected in a non-contact method received from the electronic device 10, the environment data (e.g., information sensed by the environmental sensor 14), the additional information (e.g., personal information, camera information, photographing information, or at least a part of image information) and the at least one artificial intelligence model (23b, 23c), and transmit the specific type of the bio-signal to the electronic device 10.

Meanwhile, it is not limited to the described example, and at least some of the components (e.g., at least one artificial intelligence model 23b and 23c, and the above-described second bio-signal measurement module 24b) may be implemented in the electronic device 10. For example, when the second bio-signal measurement module 24b is implemented in the electronic device 10, the electronic device 10 may obtain a non-contact bio-signal and a contact bio-signal, and transmit the plurality of bio-signals to the usage server 20b.

On the other hand, it is not limited to the described example, the usage server 20b is not implemented, and he at least one artificial intelligence model 23b and 23c that is learned may be stored in a single server perform both the function of the learning server 20a and the function of the usage server 20b and/or the electronic device 10.

Hereinafter, an example of an operation of acquiring (or collecting) data for learning an artificial intelligence model of the learning server 20a according to various embodiments will be described.

Figure 5:
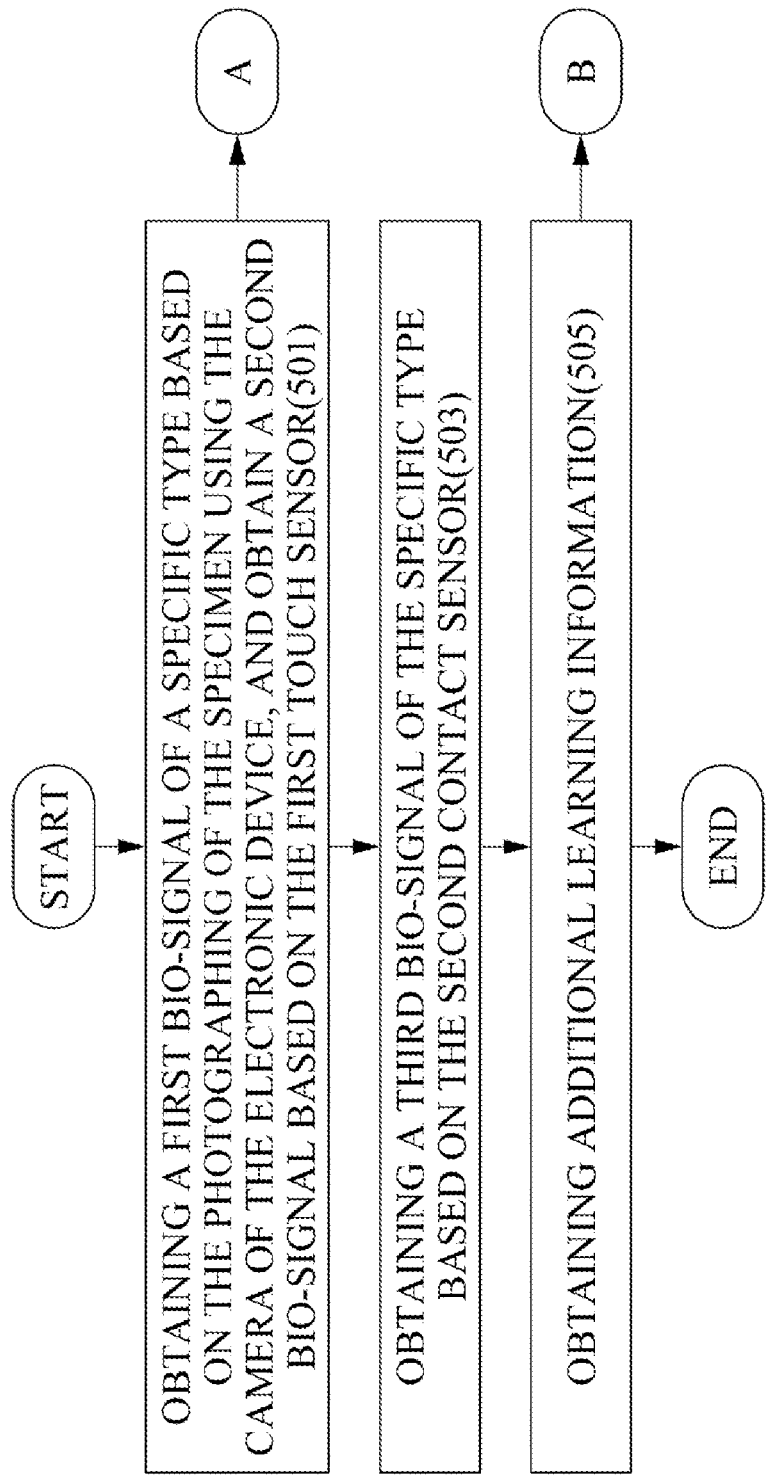
FIG. 5 is a flowchart illustrating an example of an operation of acquiring (or collecting) data for learning an artificial intelligence model of a learning server, according to various embodiments.

FIG. 5 is a flowchart illustrating an example of an operation of acquiring (or collecting) data for learning an artificial intelligence model of the learning server 20a according to various embodiments. Operations may be performed regardless of the order of operations shown and/or described, more operations may be performed and/or less operations may be performed. Hereinafter, FIG. 5 will be further described with reference to FIGS. 6 and 7.

Figure 6:
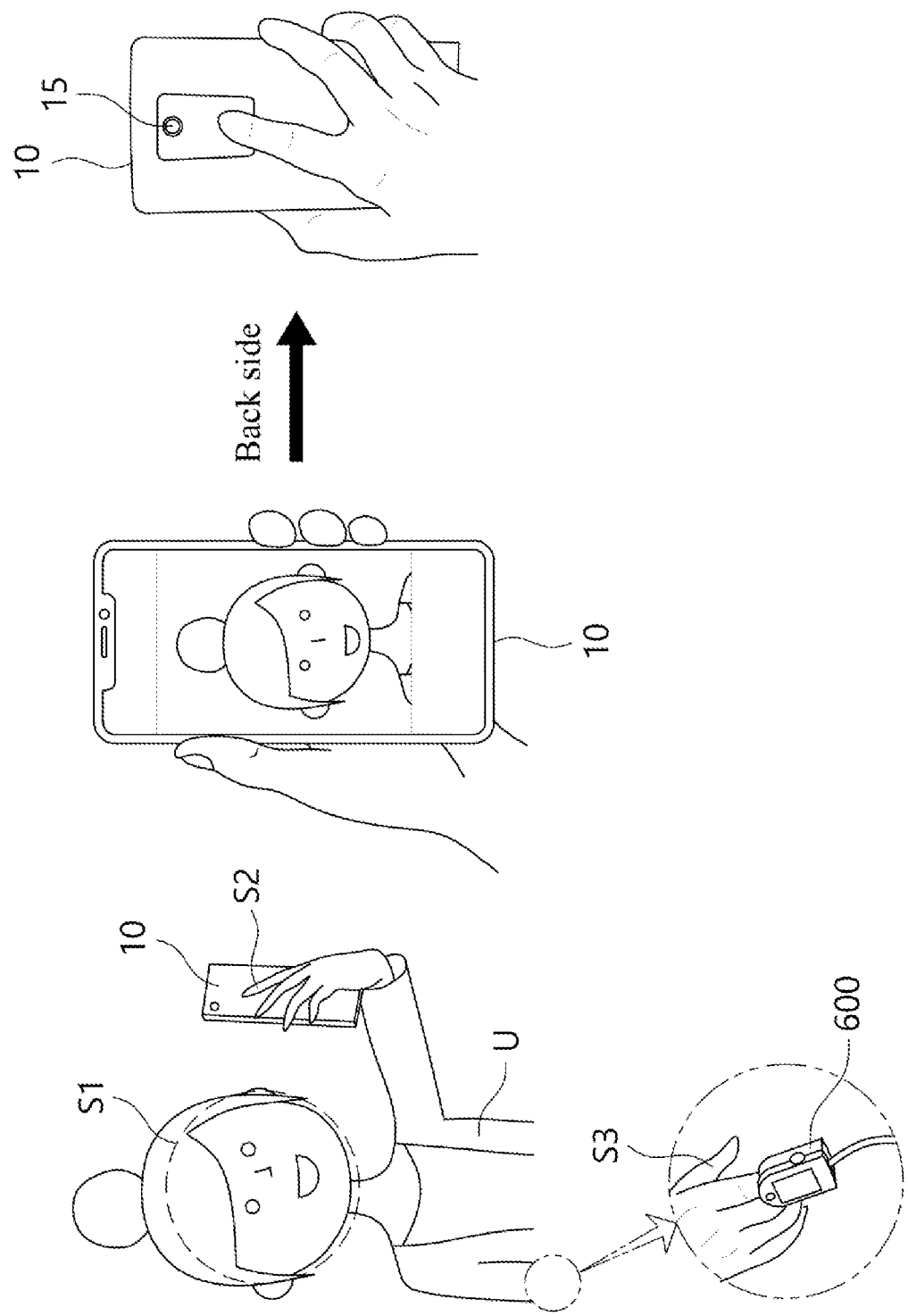
FIG. 6 is a view for explaining an example of an operation of simultaneously collecting bio-signals in a non-contact method and a contact method of an electronic device according to various embodiments.
Figure 7:
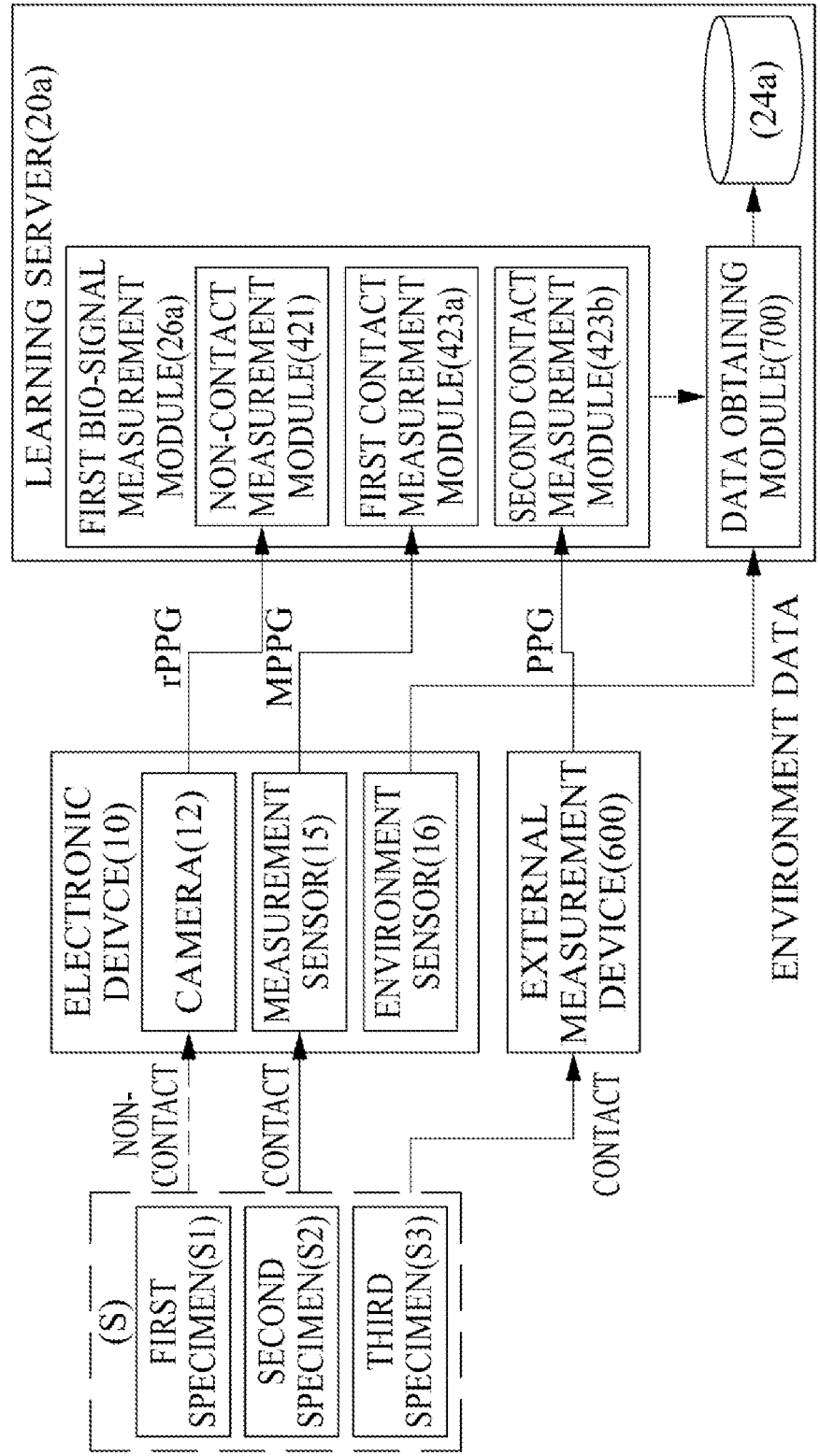
FIG. 7 is a view for explaining an example of an operation of accumulating data for artificial intelligence model learning in a learning server according to various embodiments.

FIG. 6 is a view for explaining an example of an operation of simultaneously collecting bio-signals in a non-contact method and a contact method of the electronic device 10 according to various embodiments. FIG. 7 is a view for explaining an example of an operation of accumulating data for artificial intelligence model learning in the learning server 20a according to various embodiments.

According to various embodiments, the learning server 20a (e.g., the second processor 22a), in operation 501, may obtain a first bio-signal of a specific type based on the photographing of the specimen S using the camera 12 of the electronic device 10, and obtain a second bio-signal based on the first touch sensor 15, and, in operation 503, obtain a third bio-signal of the specific type based on the second contact sensor. For example, referring to FIG. 6, the learning server 20a may obtain all (or simultaneously or during a specific period of time) of the first bio-signal, the second bio-signal, and the third bio-signal correlated with each other of the specific type using a user U, an electronic device 10 held by the user U, and an external measurement device 600 contacting a body part of the user U. The meaning of the bio-signals are correlated with each other may mean that they are obtained during a specific period in which the correlation with each other is higher than a threshold value. For example, the specific type of bio-signals may be PPG. As shown in FIG. 6, while the user U is in a state where the external measurement device 600 is provided (or mounted) on the user's third specimen (e.g., the finger S3 of the first hand) of the user U, the user U may make the user's second specimen (e.g., the finger of the second hand S2) to be contacted with a contact sensor disposed in a specific area (e.g., rear surface) of the electronic device 12 while photographing the user's first specimen (e.g., the face S1) using the camera 10 of the electronic device 12. Accordingly, referring to FIG. 7, the learning server 20a may receive a plurality of images of the first specimen S1 captured by the camera 12 of the electronic device 10 and measured sensing data (e.g., mobile PPG, MPPG) measured by the measurement sensor 15 from the electronic device 10, and receive sensing data (e.g., PPG) measured by the external measurement device 600 from the external measurement device 600.

For example, the non-contact measurement module 421 of the learning server 20a may obtain the specific type of non-contact bio-signal based on analyzing the plurality of images of the first specimen S1. For example, the specific type of non-contact bio-signal may be rPPG. The plurality of images may be images acquired based on setting at least one parameter of the camera to a value within a specific range. For example, the images may be obtained in a state in which the camera parameters are set so that the FPS ranges from 20 to 30 per second.

For example, the first contact measurement module 423a of the learning server 20a may obtain the specific type of the first contact bio-signal based on sensing data received from the measurement sensor 15. The specific type of first contact bio-signal measured by the electronic device 10 may be a PPG, which may be defined as a mobile PPG (MPPG). The first contact measurement module 423a may obtain MPPG that has already been measured by the electronic device 10 and received from the electronic device 10 to the learning server 20a, but is not limited to the described example, the electronic device 10 may be configured to measure MPPG based on obtaining sensing data received from the measurement sensor (15) and analyzing the obtained sensing data.

For example, the second contact measurement module 423b of the learning server 20a may obtain the specific type of second contact bio-signal based on sensing data received from the external measurement device 600. The second specific type of contact bio-signal may be a PPG, and may have relatively high accuracy compared to the accuracy of the aforementioned mobile PPG (MPPG). The second contact measurement module 423b may obtain PPG that has already been measured by the external measurement device 600, but is not limited to the described example, the electronic device 10 may be configured to measure PPG based on obtaining sensing data received from the measurement device 600 and analyzing the obtained sensing data.

According to various embodiments, the learning server 20a (eg, the data obtaining module 700) may obtain additional learning information in operation 505. The additional learning information may include additional information including at least a part of personal information obtained based on an application (not shown), camera information, photographing information, or image information, and environment data acquired based on the environment sensor 16. For example, the electronic device 10 may use the environment sensor 16 to acquire information related to the surrounding environment being photographed and information related to the state of the electronic device 10 at the time of photographing, and transmit the information to the learning server 20a. Also, for example, the electronic device 10 may transmit personal information input through the execution screen to the learning server 20a based on the execution of the application. Also, for example, the electronic device 10 may transmit camera information obtained based on the authority set based on the execution of the application, and at least some of the photographing information and image information based on analyzing the video and/or image captured by the camera 12 to the learning server 20a.

According to various embodiments, the data obtaining module 700 may be configured to obtain the aforementioned specific types of bio-signals (eg, a non-contact bio-signal, a first contact bio-signal, and a second contact bio-signal) and additional learning. information may be stored in the database 24a in an interrelated form. At this time, the data obtaining module 700 may be configured to perform time synchronization of specific types of bio-signals (e.g., non-contact bio-signals, first contact bio-signals, and second contact bio-signals), but not limited to the described example, the time synchronization may not be performed.

Hereinafter, as at least a part of operation 501 of the learning server 20a according to various embodiments, an example of an operation of obtaining a non-contact bio-signal will be described.

Figure 8:
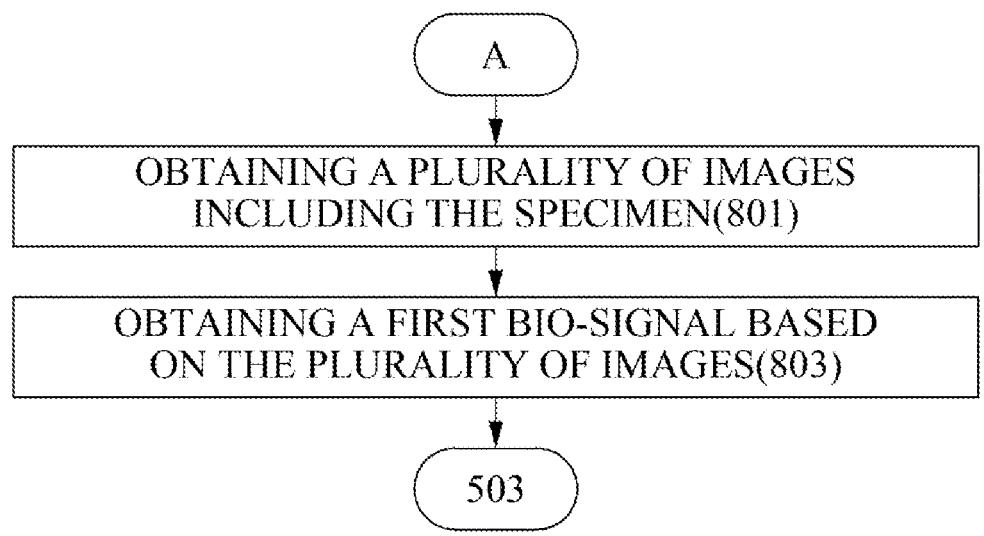
FIG. 8 is a flowchart illustrating an example of an operation of obtaining a non-contact bio-signal of a learning server, according to various embodiments.

FIG. 8 is a flowchart illustrating an example of an operation of acquiring a non-contact bio-signal of the learning server 20a, according to various embodiments. The operations may be performed regardless of the order of operations shown and/or described, more operations may be performed and/or less operations may be performed. Hereinafter, FIG. 8 will be further described with reference to FIGS. 9 to 11.

Figure 10:
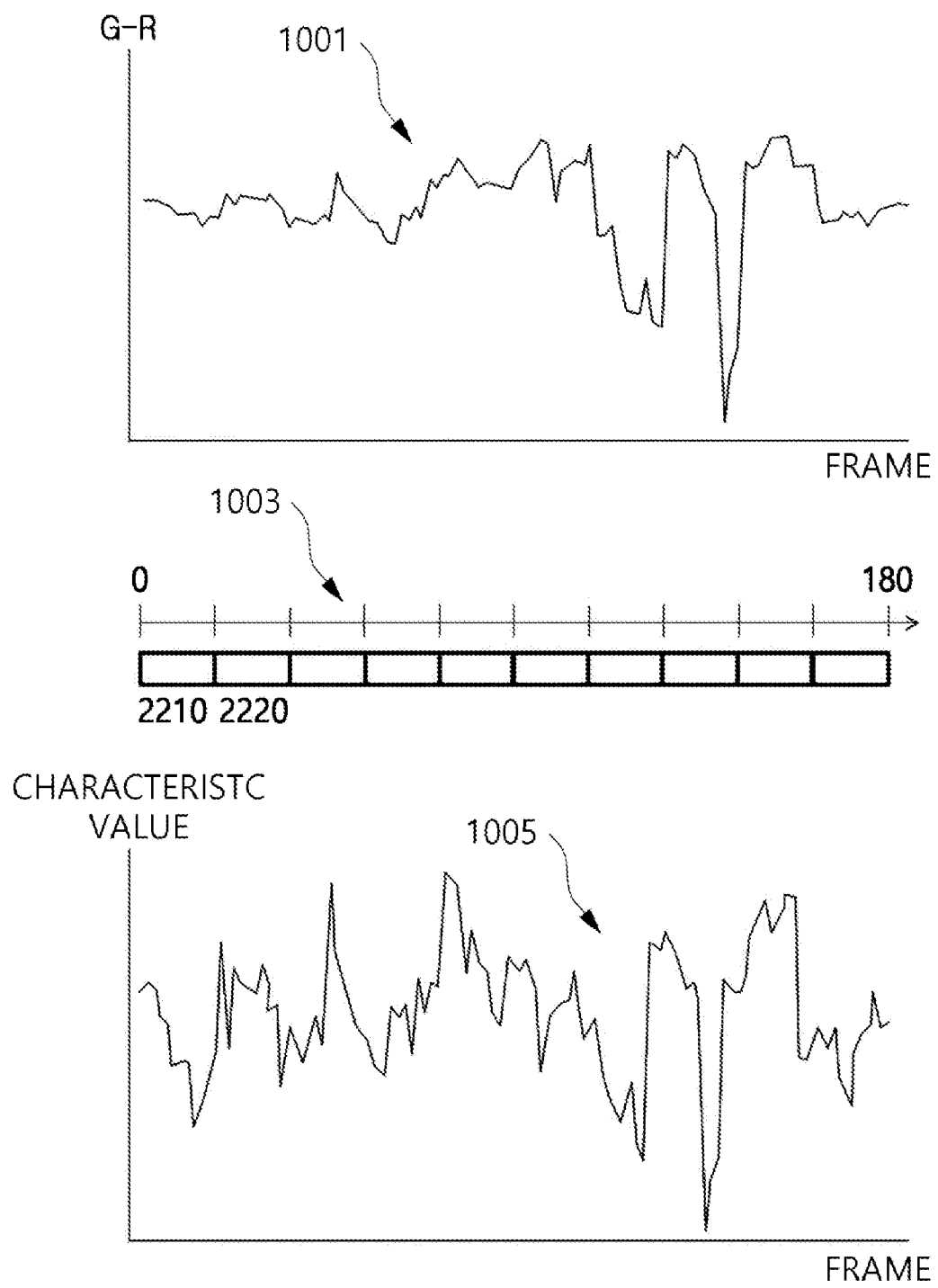
FIG. 10 is a view for explaining an example of an operation of obtaining a characteristic value, according to various embodiments.
Figure 11:
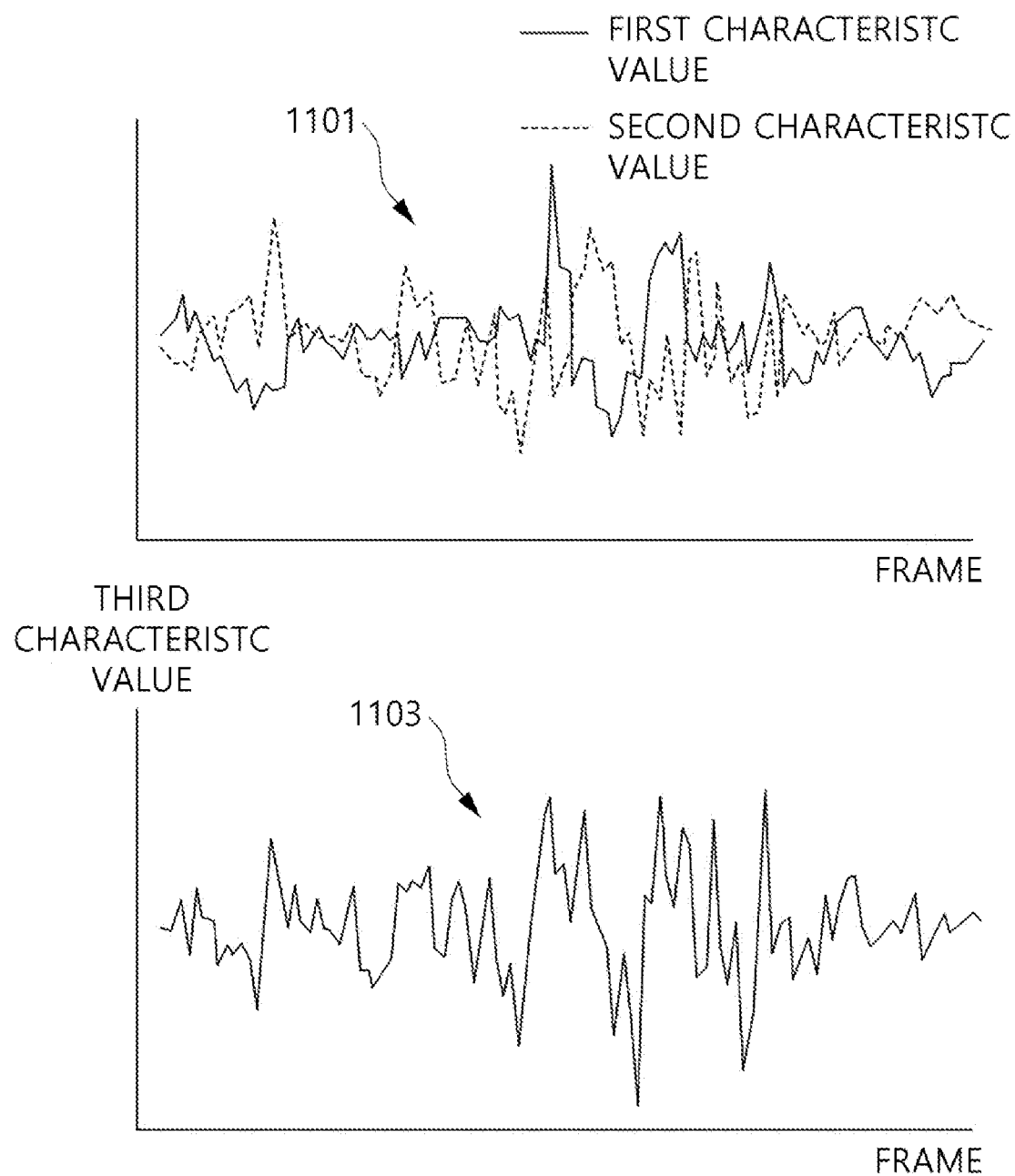
FIG. 11 is a view for explaining an example of an operation of acquiring a characteristic value, according to various embodiments.

FIG. 9 is a view for explaining an example of an operation of obtaining a difference value between color channels (e.g., a G value and an R value, or a G value and a B value) for noise reduction according to various embodiments. FIG. 10 is a view for explaining an example of an operation of obtaining a characteristic value, according to various embodiments. FIG. 11 is a view for explaining an example of an operation of acquiring a characteristic value, according to various embodiments.

According to various embodiments, the learning server 20a (e.g., the non-contact measurement module 421), in operation 801, may obtain a plurality of images including the specimen and, in operation 803, may obtain a first bio-signal based on the plurality of images. For example, the learning server 20a (e.g., the non-contact measurement module 421) may obtain values for each color channel from the plurality of images including the specimen, and obtain rPPG based on the value for each color channel. For example, the color channels may refer to R channel, G channel, and B channel of the RGB color space, but are not limited to the examples described and/or illustrated, and other color spaces (eg, CMY, HSV, etc.) may mean the color channels.

At this time, according to various embodiments, referring to FIG. 9, the operation of the obtaining rPPG may be performed based on a difference value between color channels (e.g., a G value and an R value (G-R), a G value and a B value (G-B)) in order to reduce noise.

901 of FIG. 9 is a graph showing red channel values extracted according to the RGB color space, and 903 of FIG. 9 is a graph showing green channel values extracted according to the RGB color space. Referring to 901 and 903 of FIG. 9, it can be seen that the extracted color channel values vary over time. At this time, the extracted color channel value may vary according to the heartbeat, but may also vary according to the movement of the subject or a change in the intensity of external light. More specifically, large and slow fluctuations in the color channel value are caused by being more affected by the subject's motion or external light intensity change, and small and rapid fluctuations are caused by the subject's heart rate. It may be that the fluctuations are more affected by the beat. Accordingly, the relative difference between at least two color channel values may be used to reduce the change in value caused by the movement of the subject or the change in the intensity of external light, rather than the change caused by the heartbeat.

Illustratively, a difference value between a green channel value and a red channel value may be used to reduce noise. More specifically, the green channel value and the red channel value obtained in the same image frame may reflect the same motion and the same intensity of external light, and the difference between the green channel value and the red channel value in the same frame may reduce noise caused by motion of the subject and change in intensity of external light, but is not limited thereto, and noise may be reduced using a relative difference between at least two color channel values.

905 of FIG. 9 is a graph showing a difference between the green channel value and the red channel value. As shown in 905 of FIG. 9, the difference between the green channel value and the red channel value may reduce noise caused by motion of the subject and change in intensity of external light.

Also, the above-described method of reducing noise may be performed on at least one image frame among a plurality of acquired image frames, or may be performed on each of a plurality of consecutive image frames.

In addition, although not shown in 905 of FIG. 9, noise may be reduced by using a difference between the green channel value and the blue channel value, and using the difference between the red channel value and the blue channel value Noise can also be reduced.

Also, as described above, at least two color channel values may be selected to obtain a difference value in order to reduce noise using a relative difference between the at least two color channel values.

In this case, the at least two color channel values may be selected in consideration of absorbance of blood.

According to various embodiments, referring to FIGS. 10 to 11, the learning server 20a may obtain time series data (e.g., a first characteristic value and a second characteristic value) of each of the difference between the green channel value and the red channel value and the difference between the green channel value and the blue channel value, and obtain a third characteristic value by merging the obtained time-series data, and obtain rPPG based on the third characteristic value.

1001 of FIG. 10 is a graph showing color channel values obtained according to an exemplary embodiment, and more specifically, a graph showing a difference between a green channel value and a red channel value. However, for convenience of description, this is only specifically shown as a difference value between a green channel value and a red channel value, and is not limited thereto, and may be various color channel values, difference values, and processed values.

Referring to 1001 of FIG. 10, it may be seen that the difference between the green channel value and the red channel value (hereinafter referred to as 'G-R value') may not have a constant magnitude of change over time.

At this time, the value of the G-R value may not be constant due to the motion of the subject. For example, when the subject moves little, the change of the G-R value may be small, and when the subject moves a lot, the change of the G-R value may be large, but is not limited thereto.

Also, the G-R value may not be constant depending on the intensity of external light. For example, when the intensity of external light is weak, the change of the G-R value may be small, and when the intensity of external light is strong, the change of the G-R value may be large, but is not limited thereto.

Accordingly, a characteristic value may be extracted to reduce noise caused by the motion of the subject or the intensity of external light.

Also, a window for the characteristic value may be set to extract the characteristic value.

In this case, the window for the characteristic value may mean a preset time interval or a preset number of frames, but is not limited thereto, may mean a window for setting at least some frame groups among a plurality of frames to obtain the characteristic value.

1003 of FIG. 10 is a schematic diagram for explaining a window for characteristic values, and more specifically, a schematic diagram for explaining a window for characteristic values set to 18 image frames obtained by dividing 180 image frames into 10 equal parts. However, for convenience of explanation, this only shows a window for a characteristic value set to 18 image frames obtained by dividing 180 image frames into 10 equal parts, and the window for a characteristic value can be set in various ways and numbers without being limited thereto.

Referring to 1005 of FIG. 10, a plurality of acquired image frames may be set as a group by a window for a characteristic value. For example, as shown in 1005 of FIG. 19, 180 image frames may be set as a group including 18 image frames by a window for a characteristic value. More specifically, the 1st image frame to the 18th image frame may be included in the first image frame group 2210, and the 19th image frame to the 36th image frame may be included in the second image frame group 2220, but is not limited thereto.

In this case, the characteristic value may be obtained for a group of image frames set by a window for the characteristic value. For example, the characteristic value may be obtained for color channel values for the first image frame group 2210 and for color channel values for the second image frame group 2220.

Also, for example, when the characteristic value is an average value, an average value of color channel values for a group of image frames may be obtained. More specifically, an average value of G-R values for the 1st to 18th image frames included in the first image frame group 2210 may be obtained, and average value of G-R values for the 19th to 36th image frames included in the second image frame group 2220 may be obtained, but is not limited thereto.

Also, for example, when the characteristic value is a standard deviation value, a standard deviation value of color channel values for a group of image frames may be obtained. More specifically, standard deviation values of G-R values for the 1st to 18th image frames included in the first image frame group 2210 may be obtained, and standard deviation value of G-R values for the 19th to 36th image frames included in the second image frame group 2220 may be obtained, but is not limited thereto.

However, it is not limited to the above examples, and various characteristic values may be obtained for the image frame group.

In addition, the characteristic value may be obtained for at least some image frames included in an image frame group divided by a window for the characteristic value. For example, the characteristic value may be obtained for color channel values of at least some of the 18 image frames included in the first image frame group 2210, and the second image frame group 2220 Color channel values of at least some of the included 18 image frames may be obtained.

Also, for example, when the characteristic value is a deviation value, deviation values of color channel values of at least some image frames included in the image frame group may be obtained. More specifically, a deviation value of the G-R value of the first image frame included in the first image frame group with respect to the average G-R value of the first image frame group 2210 may be obtained, and the second image frame group 2220a deviation value of the G-R value of the 19th image frame included in the second image frame group with respect to the average G-R value of, may be obtained, but is not limited thereto.

Also, for example, when the characteristic value is a deviation value, deviation values of color channel values of at least some image frames included in the image frame group may be obtained. More specifically, a deviation value of the G-R value of the first image frame included in the first image frame group with respect to the average G-R value of the first image frame group 2210 may be obtained, and the first image frame group 2210 A deviation value of the G-R value of the second image frame included in may be obtained, but is not limited thereto.

Also, the obtained characteristic values may be normalized.

For example, when the characteristic value is a deviation value, the deviation value may be normalized by a standard deviation value. More specifically, when a deviation value of the G-R value of the first image frame included in the first image frame group 2210 with respect to the average G-R value of the first image frame group 2210 is obtained, the G-R value of the first image frame group 2210 is obtained. The deviation value may be normalized by the standard deviation value of the first image frame group 2210, but is not limited thereto and may be normalized in various ways.

In addition, when normalized as described above, the size of the change amount is normalized so that the change in value due to the heartbeat can be better reflected, and noise caused by the subject's motion and the change in the intensity of external light can be effectively reduced.

1101 of FIG. 11 is a graph showing two characteristic values obtained according to an embodiment, and more specifically, showing a first characteristic value obtained based on G-R values and a second characteristic value obtained based on G-B values. However, this is only specifically shown for convenience of description, but is not limited thereto and may be a characteristic value obtained based on various color channel values, difference values, and processed values.

In this case, the first characteristic value obtained based on the G-R value may be influenced by the G-R value. For example, when the external light is light close to the blue channel, the G-R value may not reflect the change of blood according to the heartbeat well.

Alternatively, for example, a change in blood according to a heartbeat may be reflected by being affected by a difference between absorbance of a green channel and absorbance of a red channel.

Also, the second characteristic value obtained based on the G-B value may be influenced by the G-B value. For example, when the external light is light close to the red channel, the G-B value may not reflect the change of blood according to the heartbeat well.

Alternatively, for example, a change in blood according to a heartbeat may be reflected by being affected by a difference between absorbance of a green channel and absorbance of a blue channel.

Also, referring to 1101 of FIG. 11, the first characteristic value and the second characteristic value may have a complementary relationship. For example, in a section where the first characteristic value does not reflect the change according to the heartbeat well, the second characteristic value may well reflect the change according to the heartbeat, and vice versa.

Accordingly, the first characteristic value and the second characteristic value may be used to reduce noise caused by a change in the wavelength of external light or better reflect a change in blood caused by a heartbeat.

1103 of FIG. 11 is a graph showing a third characteristic value obtained by using the first characteristic value and the second characteristic value, and more specifically, the third characteristic value obtained by summing the first characteristic value and the second characteristic value. It is a graph showing the value of the third characteristic. However, this is only specifically shown for convenience of description, but is not limited thereto.

In addition, the third characteristic value may be obtained based on an operation of the first characteristic value and the second characteristic value. For example, the third characteristic value is the first characteristic value and the second characteristic value. It may be obtained based on a sum operation of, but is not limited thereto, and may be obtained based on various operations such as a difference operation and a multiplication operation.

Also, the third characteristic value may be obtained by assigning various weights to the first characteristic value and the second characteristic value. For example, it may be obtained based on Equation (1) below, but is not limited thereto:

$$\text{The third characteristics value} = \quad (1)$$
$$a * \text{the first characteristic value} + b * \text{the second characteristic value}$$

In addition, referring to 1101 and 1103 of FIG. 11, the third characteristic value may better reflect the change in blood according to the heartbeat than the first characteristic value and the second characteristic value, and the external light Noise caused by a change in wavelength can be reduced.

Hereinafter, as at least a part of operation 505 of the learning server 20a according to various embodiments, an example of an operation of performing time synchronization on a plurality of bio-signals will be described.

Figure 12:
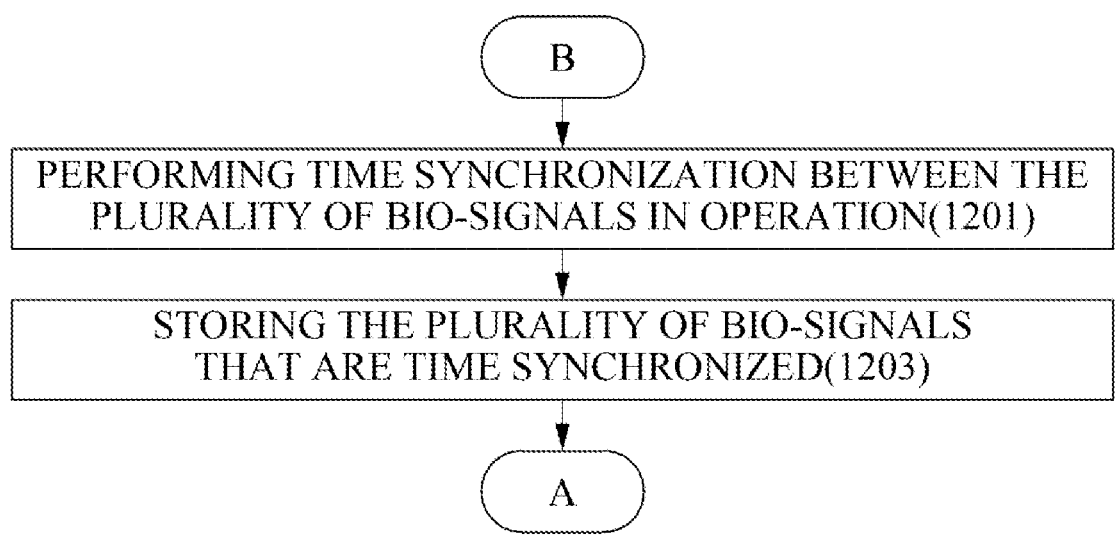
FIG. 12 is a flowchart illustrating an example of an operation of obtaining a non-contact bio-signal of a learning server, according to various embodiments.

FIG. 12 is a flowchart illustrating an example of an operation of acquiring a non-contact bio-signal of the learning server 20a, according to various embodiments. Acts may be performed regardless of the order of acts shown and/or described, more acts may be performed and/or less acts may be performed. Hereinafter, FIG. 12 will be further described with reference to FIGS. 13 and 14.

Figure 14:
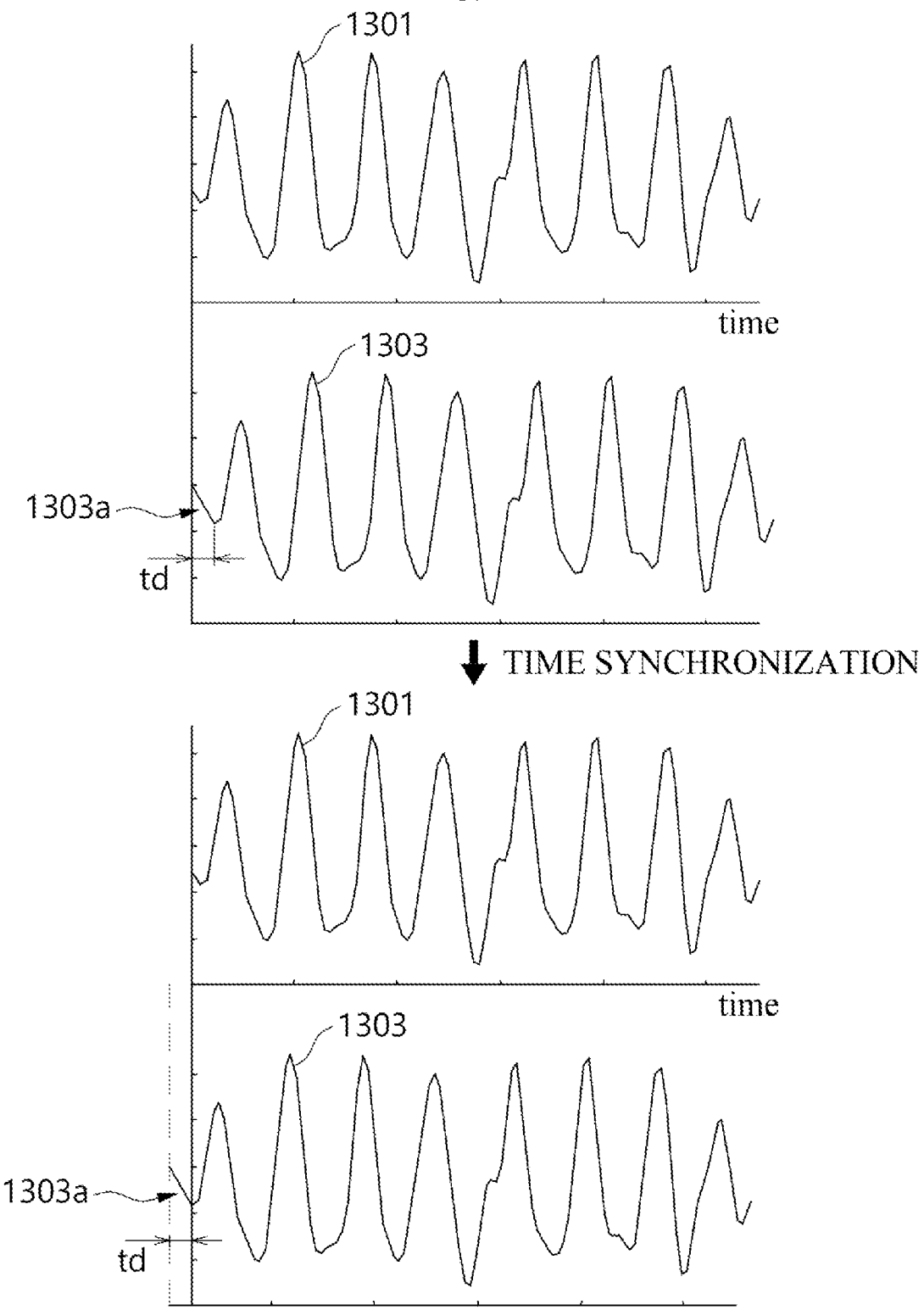
FIG. 14 is a view for explaining an example of a time synchronization operation of physiological signals of a learning server, according to various embodiments.

FIG. 13 is a view for describing examples of bio-signals, according to various embodiments. FIG. 14 is a view for explaining an example of a time synchronization operation of physiological signals of the learning server 20a, according to various embodiments.

According to various embodiments, the learning server 20a (e.g., the data obtaining module 700) may perform time synchronization between the plurality of bio-signals in operation 1201, and may store the plurality of bio-signals that are time synchronized in operation 1203. For example, referring to FIG. 13, based on the different positions of the specimens S1 and S2 to which the plurality of bio-signals 1301 and 1301 are measured, each of the plurality of bio-signals 1301 and 1303 may have different magnitudes (or intensities) (or different patterns) for each time. For example, the second bio-signal 1303, which is obtained by the measurement sensor 15 based on the contact of the specimen S2 (e.g., a finger of the first hand) relatively distant from the heart, may be delayed by a specific time td than the first bio-signal 1301 obtained based on photographing the specimen S1 (e.g., a face) close to the heart of the user U. Accordingly, the learning server 20a may synchronize the time of the plurality of bio-signals 1301 and 1303 based on the specific time td for more sophisticated learning. For example, referring to FIG. 14, the learning server 20a may perform an operation of deleting (or excluding) the signal 1303 a corresponding to the specific time td of the second bio-signal 1303 or advancing the time of the second bio-signal 1303 by the specific time td. In addition, for example, the learning server 20a may perform an operation (e.g., time shifting) of moving the first bio-signal 1303 backward by the specific time td. Although not illustrated, the learning server 20a may also perform visual synchronization with respect to the third bio-signal measured by the external measurement device 600.

According to various embodiments, the learning server 20a may select a reference bio-signal from among the plurality of bio-signals 1301 and 1303, and perform synchronizing of a time of the remaining bio-signals based on the specific time td identified based on the selected reference bio-signal. For example, the learning server 20a may select the first bio-signal 1301 associated with the specimen S1 closest to the heart among the plurality of bio-signals 1301 and 1303 as the reference signal. The learning server 20a may identify the specific time td based on a distance difference between the specimen S2 associated with the remaining second bio-signal 1303 (and/or the bio-signal measured by the external measurement device 600) and the specimen S2 corresponding to the first reference signal 1301, and perform the above-described time synchronization operation. Although not shown, the time synchronization of the third bio-signal measured by the external measurement device 600 may also be performed as described above.

According to various embodiments, the learning server 20a may determine the specific time td based on the personal characteristic information of the user. The learning server 20a may store information about a plurality of delay times, and identify a specific time td corresponding to the personal characteristic information of the user among the plurality of delay times. For example, the larger the height, the relatively longer the specific time td may be selected.

According to various embodiments, the learning server 20a may implement an artificial intelligence model for time synchronization and perform time synchronization based on the implemented artificial intelligence model.

Hereinafter, an example of an operation of generating an artificial intelligence model implemented to provide information about a specific type of a bio-signal having as much accuracy corresponding to a contact type based on a specific type of a bio-signal obtained by the non-contact type of the learning server 20a according to various embodiments will be described. Hereinafter, a specific type of bio-signal is PPG, but the present disclosure is not limited thereto, and an artificial intelligence model for measuring various types of bio-signals may be implemented.

Figure 15:
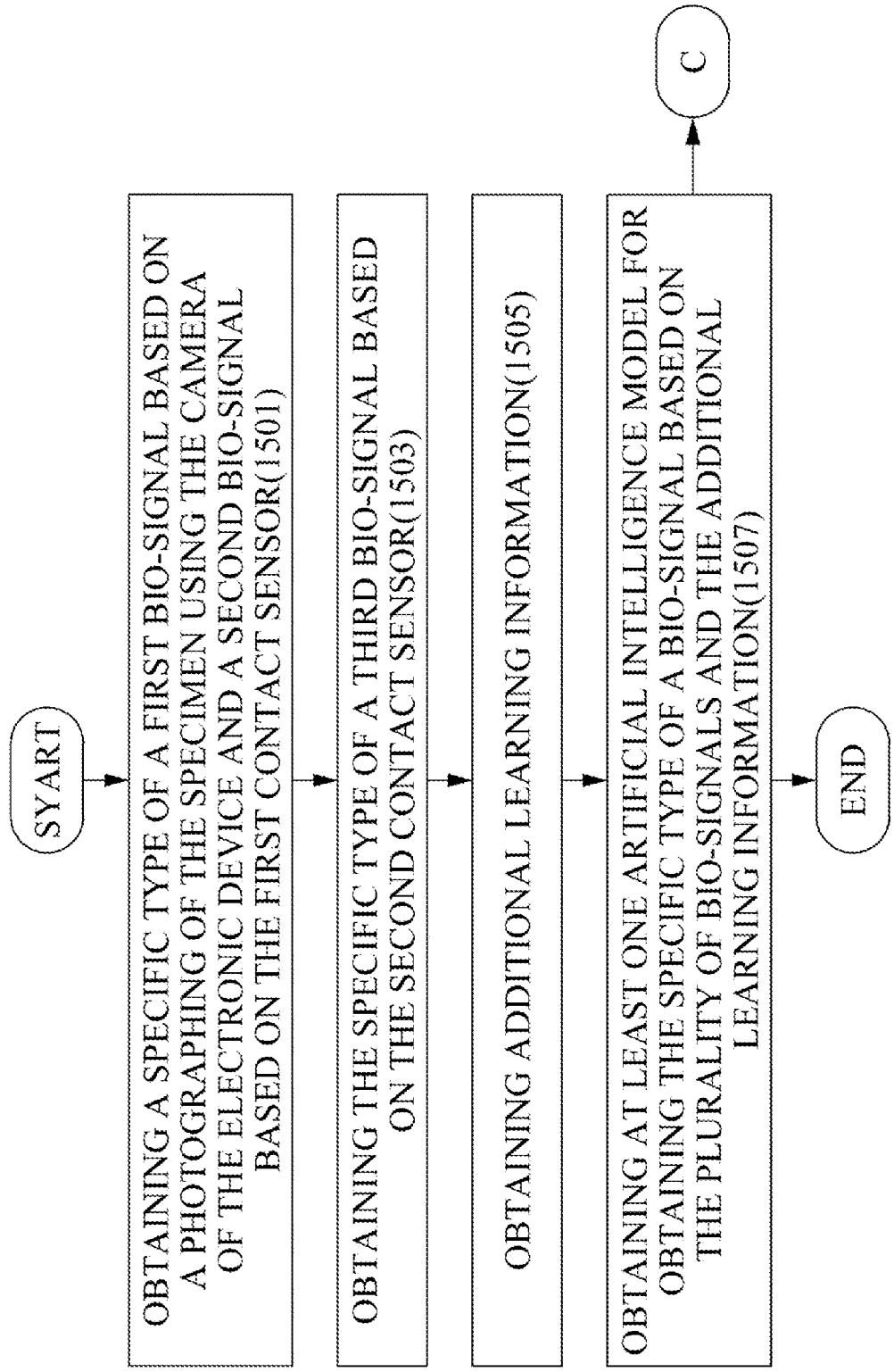
FIG. 15 is a flow chart illustrating an operation of a learning server configured to provide information on a specific type of bio-signal having accuracy corresponding to the contact method based on the specific type of bio-signal obtained in a non-contact method.

FIG. 15 is a flowchart illustrating an example of an operation of generating an artificial intelligence model implemented to provide information about a specific type of bio-signal having as accuracy as corresponding to a contact scheme based on a specific type of bio-signal obtained in a contactless manner of the learning server 20a according to various embodiments. The operations may be performed regardless of the order of operations shown and/or described, and more and/or fewer operations may be performed. Hereinafter, FIG. 15 will be further described with reference to FIGS. 16 to 18.

Figure 16:
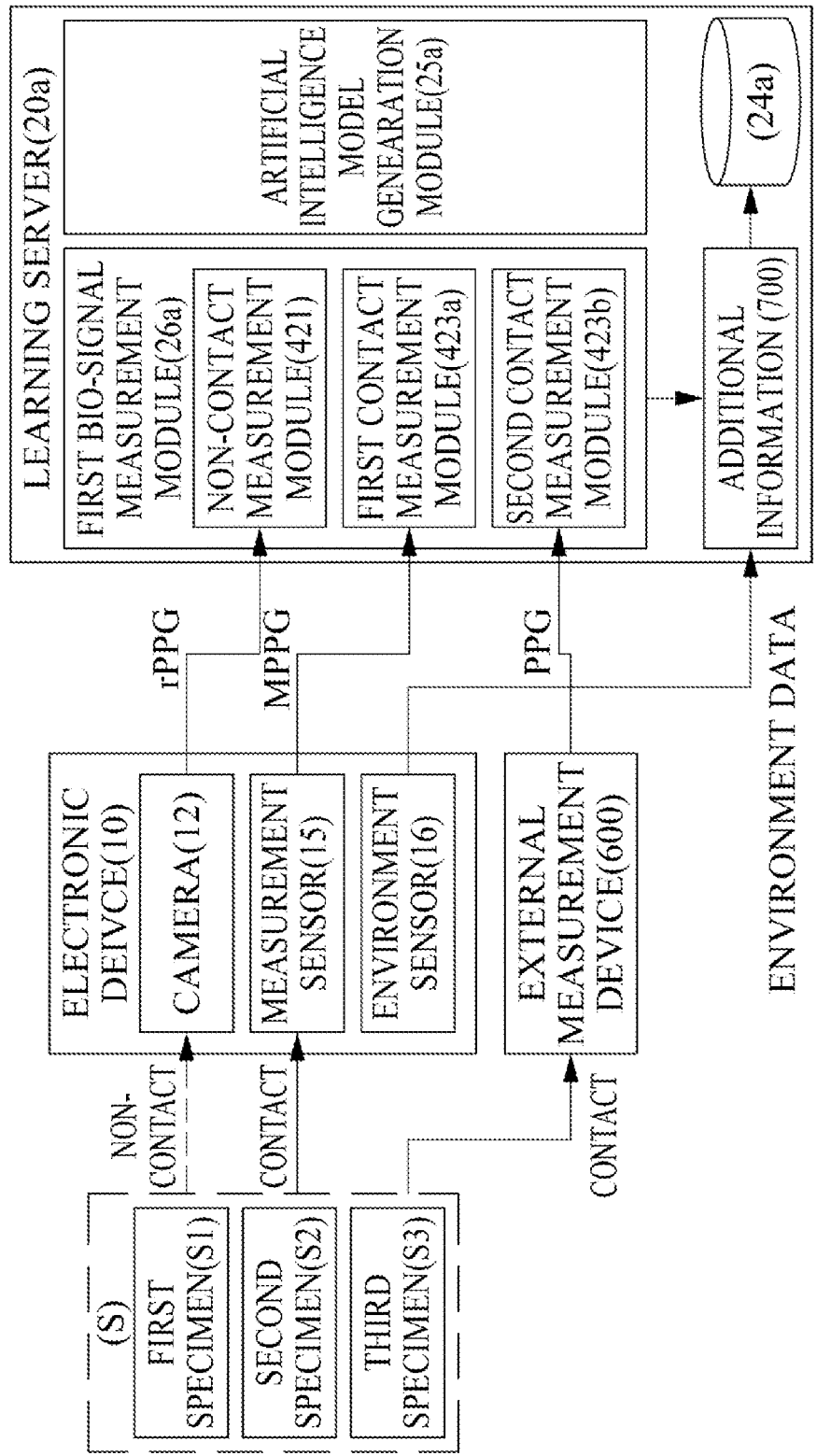
FIG. 16 is a view for explaining an example of an operation of generating an artificial intelligence model of a learning server, according to various embodiments.
Figure 17:
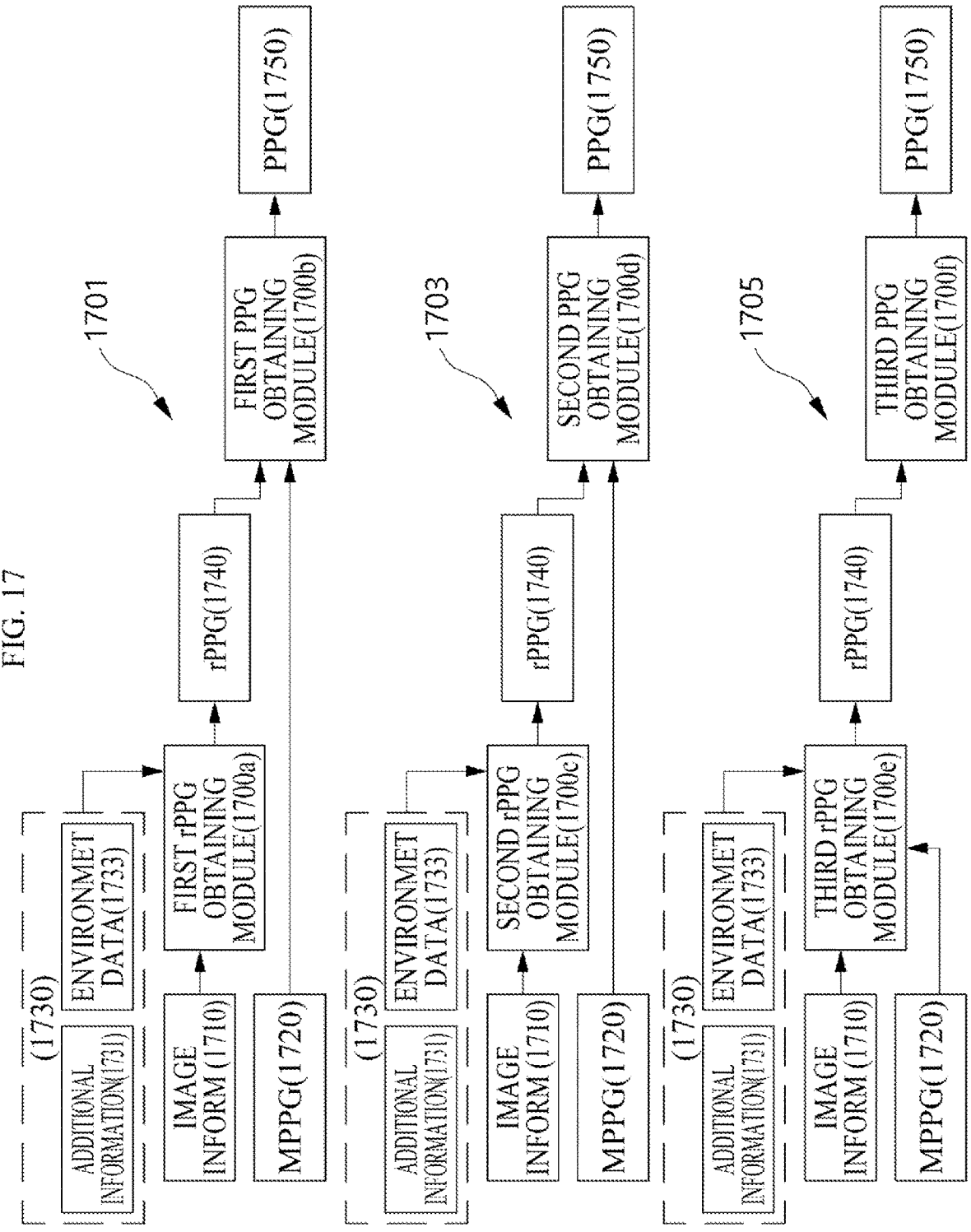
FIG. 17 is a view for explaining an example of at least one artificial intelligence model generated by a learning server, according to various embodiments.
Figure 18A:
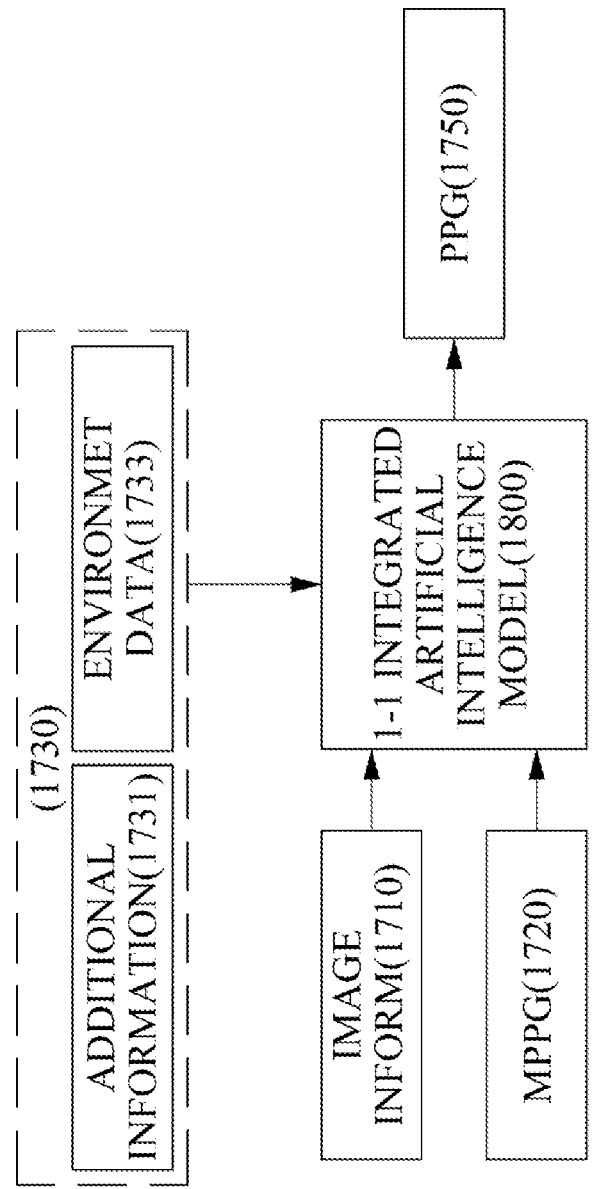
FIG. 18A is a view for explaining another example of at least one artificial intelligence model generated by a learning server, according to various embodiments.
Figure 18B:
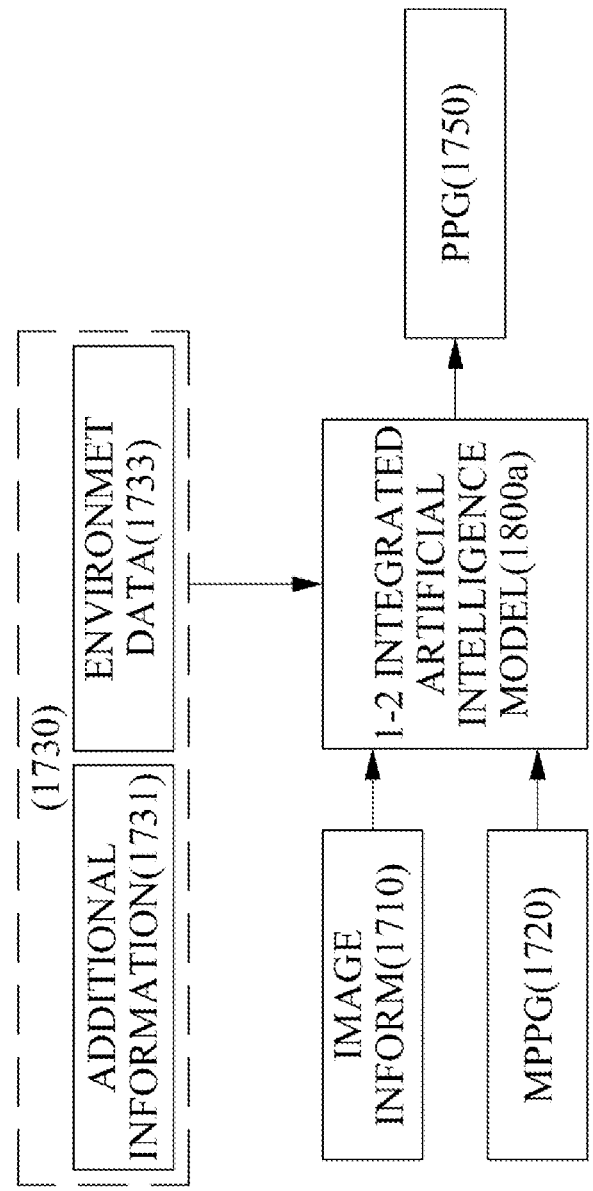
FIG. 18B is a view for explaining another example of at least one artificial intelligence model generated by a learning server, according to various embodiments.

FIG. 16 is a view for describing an example of an operation of generating an artificial intelligence model of the learning server 20a according to various embodiments. FIG. 17 is a view for describing an example of at least one AI model generated by the learning server 20a according to various embodiments. FIG. 18A is a view for describing another example of at least one artificial intelligence model generated by the learning server 20a according to various embodiments. FIG. 18B is a view for describing another example of at least one AI model generated by the learning server 20a according to various embodiments.

According to various embodiments, the learning server 20a may obtain a specific type of a first bio-signal based on a photographing of the specimen S using the camera 12 of the electronic device 10, obtain a second bio-signal based on the first contact sensor 15 in operation 1501, obtain the specific type of a third bio-signal based on the second contact sensor in operation 1503, and obtain additional learning information in operation 1505. Operations 1501 to 1505 of the learning server 20a may be implemented as operations 501 to 505 of the learning server 20a described above, and thus redundant descriptions thereof will be omitted.

According to various embodiments, the learning server 20a may obtain at least one artificial intelligence model for obtaining the specific type of a bio-signal based on the plurality of bio-signals and the additional learning information, in operation 1507. For example, referring to FIG. 16, the artificial intelligence model generation module 25a may generate at least one artificial intelligence model 1700a to 1700f and 1800a to b based on the plurality of bio-signals MPPG 1720, rPPG 1740, PPG 1750 and additional learning information 1730 (e.g., additional information 1731 and environment data 1733) stored in the database 24 a by the data obtaining module 700. In this case, the PPG data stored in the database 24 a may be time synchronized with each other, but the PPG data may not be time synchronized with each other without being limited to the described example. The at least one artificial intelligence model 1700a to 1700 f and 1800a to b may be implemented to provide a PPG estimation value of accuracy corresponding to PPG obtained by a contact method based on information (e.g., a plurality of images including a face) on the specimen obtained by the non-contact method. For example, the artificial intelligence model generation module 25a may implement the artificial intelligence model through map learning, non-map learning, semi-map learning, reinforcement learning, and the like. In addition, the artificial intelligence model generation module 25a according to an embodiment may implement the artificial intelligence model by using an artificial neural network (ANN). For example, the artificial intelligence model generation module 25a may use a Feedforward neural network, a radial basis function network, a cohonen self-organizing network, and the like, but the artificial intelligence model generation module 25a is not limited thereto. In addition, the artificial intelligence model generation module 25a according to an embodiment may implement the artificial intelligence model by using a deep neural network (DNN). For example, the artificial intelligence model generation module 25a may use a Convolutional neural network (CNN), a Recurrent neural network (RNN), a long short term memory network (LSTM), Gated Recurrent Units (GRUs), and the like, but the artificial intelligence model generation module 25a is not limited thereto.

According to various embodiments, the learning server 20a may be implemented to learn a model 1700a, 1700c, and 1700e for obtaining a non-contact PPG (rPPG) and a model 1700b, 1700d, and 1700f for obtaining a contact PPG. Accordingly, when a PPG 1750 output by inputting the rPPG 1740 output as the image information 1710 (e.g., a plurality of images) is input to the rPPG obtaining model 1700a, 1700c, and 1700e to the second PPG obtaining model 1700b, 1700d, and 1700f, PPG 1750 may be obtained.

In an embodiment, referring to 1701 of FIG. 17, the learning server 20a may be implemented to learn an artificial intelligence model (e.g., the first rPPG acquisition model 1700a) for obtaining a non-contact PPG (rPPG) and an artificial intelligence model (e.g., the first PPG acquisition model 1700b) for obtaining a contact PPG. For example, the learning server 20a may obtain the first rPPG acquisition model 1700a by learning the image information 1710 captured by the camera 12 and the additional learning information 1730 (e.g., the additional information 1731 and the environment data 1733) as input data and rPPG 1740 as output data among the pieces of information associated with each other stored in the database 24a. The first rPPG acquisition model 1700a may be implemented to output the rPPG 1740 when the image information 1710 and the additional learning information 1730 (e.g., the additional information 1731 and the environment data 1733) are input. For example, the learning server 20a may obtain the first PPG acquisition model 1700b by learning the rPPG 1740 and the MPPG 1720 as input data and learning the PPG 1750 as output data among the pieces of information stored in the database 24a. The second PPG acquisition model 1700b may be implemented to output the PPG 1750 when the rPPG 1740 and the MPPG 1720 are input. When the rPPG 1740 output as the image information 1710 and the additional learning information 1730 (e.g., the additional information 1731 and the environment data 1733) are input to the first rPPG acquisition model 1700a and the MPPG 1720 obtained by the electronic device 10 are input to the second rPPG acquisition model 1700b, the rPPG 1750 may be obtained.

In another embodiment, referring to 1703 of FIG. 17, the learning server 20a may be implemented to learn a model (e.g., the second rPPG acquisition model 1700c) for obtaining a non-contact PPG (rPPG) and an artificial intelligence model (e.g., the second PPG acquisition model 1700d) for obtaining a contact PPG. For example, the learning server 20a may obtain the second rPPG acquisition model 1700c by learning the image information 1710 captured by the camera 12 as input data and the rPPG 1740 as output data among the pieces of information associated with each other stored in the database 24a. The second rPPG acquisition model 1700c may be configured to output the rPPG 1740 when the image information 1710 is input. Meanwhile, the second rPPG acquisition model 1700c may be software and/or algorithms for obtaining a third characteristic value based on the G-R and the G-B described above with reference to FIG. 9. For example, the learning server 20a may obtain the second PPG acquisition model 1700d by learning the rPPG 1740, the additional learning information 1730, and the MPPG 1720 as input data and learning the PPG 1750 as output data among the pieces of information stored in the database 24a. The second PPG acquisition model 1700d may be implemented to output the PPG 1750 when the rPPG 1740, the additional learning information 1730, and the MPPG 1720 are input. When rPPG 140 output when the image information 1710 is input to the second rPPG acquisition model 1700c, the MPPG 1720 obtained by the electronic device 10, and the additional learning information 1730 (e.g., the additional information 1731 and the environment data 1733) are input to the second rPPG acquisition model 1700d, the PPG 1750 may be obtained.

In another embodiment, referring to 1705 of FIG. 17, the learning server 20a may be implemented to learn an artificial intelligence model (e.g., a third rip acquisition model 1700e) for obtaining a non-contact PPG (rPPG) and an artificial intelligence model (e.g., a third PPG acquisition model 1700f) for obtaining a contact PPG. For example, the learning server 20a may obtain the third rPPG acquisition model 1700e by learning the image information 1710, the MPPG 1720, and the additional learning information 1730 captured by the camera 12 as input data and the rPPG 1740 as output data among the pieces of information associated with each other stored in the database 24a. The third rPPG acquisition model 1700e may be implemented to output the rPPG 1740 when the image information 1710, the MPPG 1720, and the additional learning information 1730 (e.g., the additional information 1731 and the environment data 1733) are input. In another example, the learning server 20a may obtain the third PPG acquisition model 1700d by learning the rPPG 1740 as input data and the PPG 1750 as output data among the pieces of information stored in the database 24a. The third PPG acquisition model 1700f may be implemented to output the PPG 1750 when the rPPG 1740 is input. When rPPG 1740 output as the image information 1710, the MPPG 1720, and the additional learning information 1730 (e.g., the additional information 1731 and the environment data 1733) are input to the third rPPG acquisition model 1700e is input to the third PPG acquisition model 1700f, the PPG 1750 may be obtained.

According to various embodiments, the learning server 20a may learn a single integrated artificial intelligence model (e.g., the integrated artificial intelligence model 1800a to b) for obtaining a PPG. For example, referring to 1801 of FIG. 18, the learning server 20a may obtain the 1-1 integrated artificial intelligence model 1800a by learning the image information 1710, the MPPG 1720, and the additional learning information 1730 as input data and the PPG 1740 as output data. The 1-1 integrated artificial intelligence model 1800a may be implemented to output the PPG 1750 when the image information 1710, the MPPG 1720, and the additional learning information 1730 (e.g., the additional information 1731 and the environment data 1733) are input. Meanwhile, without being limited to the described example, the 1-1 integrated artificial intelligence model 1800a may be implemented to output the rPPG 1720 when the image information 1710, the MPPG 1720, and the additional learning information 1730 (e.g., the additional information 1731 and the environment data 1733) are input.

According to various embodiments, the learning server 20a may learn a single integrated artificial intelligence model (e.g., the 1-1 integrated artificial intelligence model 1800a, the 1-2 integrated artificial intelligence model 1800b) for obtaining a PPG. For example, referring to 1803 of FIG. 18, the learning server 20a may obtain the 1-2 integrated artificial intelligence model 1800b by learning the image information 1710, the PPG 1750, and the additional learning information 1730 as input data and the rPPG 1740 or the MPPG 1720 as output data. The 1-2 integrated artificial intelligence model 1800b may be implemented to output the MPPG 1720 or the rPPG 1740 when the image information 1710, the PPG 1750, and the additional learning information 1730 (e.g., the additional information 1731 and the environment data 1733) are input.

Hereinafter, an example of an operation of generating an artificial intelligence model without time synchronization as at least part of operation 1507 of the learning server 20a according to various embodiments will be described.

Figure 19:
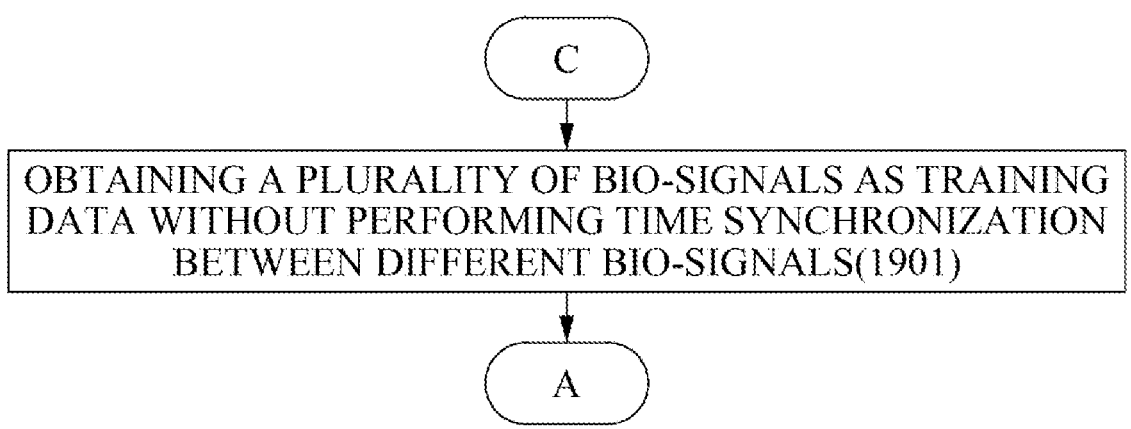
FIG. 19 is a flowchart illustrating an example of an operation of generating an artificial intelligence model without time synchronization of a learning server, according to various embodiments.

FIG. 19 is a flowchart illustrating an example of an operation of generating an artificial intelligence model without time synchronization of the learning server 20a according to various embodiments. Operations may be performed regardless of the order of the operations shown and/or described, and more operations may be performed and/or fewer operations may be performed.

According to various embodiments, in operation 1901, the learning server 20a may obtain a plurality of bio-signals (e.g., rPPG, MPPG, and PPG) as training data without performing time synchronization between different bio-signals (e.g., rPPG, MPPG, and PPG).

Accordingly, the learning server 20a may perform an operation of learning at least one artificial intelligence model 1700a to 1700 f and 1800a to b described above based on a plurality of bio-signals (e.g., rPPG, MPPG, and PPG) in which time synchronization is not performed. Accordingly, even when information obtained by the electronic device 10 is input in a state in which later time synchronization is not performed, the implemented at least one artificial intelligence model 1700a to 1700 f and 1800a to b may be implemented to output information about PPG with high accuracy.

Hereinafter, an example of an operation of generating another artificial intelligence model of the learning server 20a according to various embodiments will be described. Hereinafter, although the specific type of bio-signal is PPG, the artificial intelligence model for measuring various types of bio-signals may be implemented without being limited to the described example.

According to various embodiments, a time difference td between the plurality of bio-signals (e.g., rPPG, MPPG, and PPG) may be used to measure body information such as blood pressure.

Figure 20:
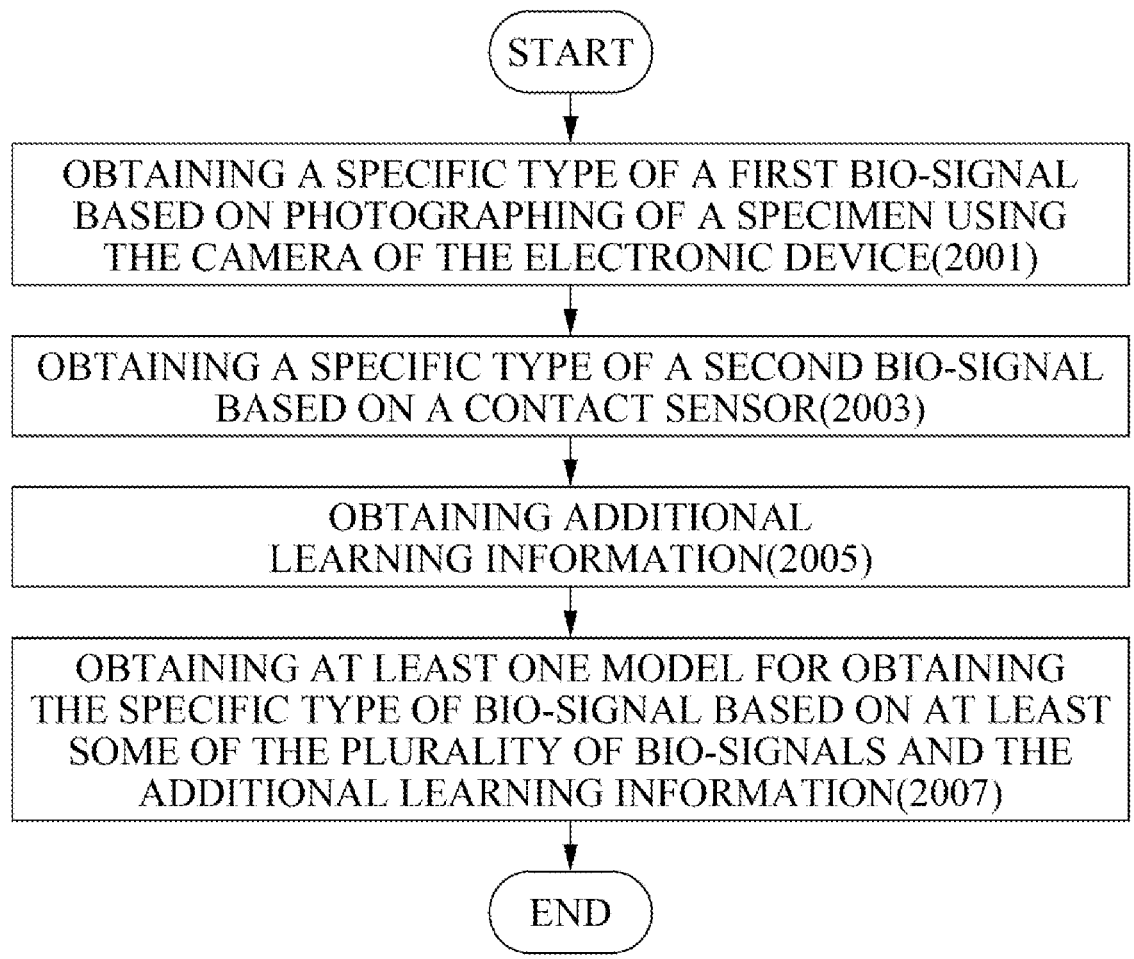
FIG. 20 is a flowchart illustrating an example of an operation of generating another artificial intelligence model of a learning server according to various embodiments.

FIG. 20 is a flowchart illustrating an example of an operation of generating another artificial intelligence model of the learning server 20a according to various embodiments. Operations may be performed regardless of the order of the operations shown and/or described, and more operations may be performed and/or fewer operations may be performed. Hereinafter, FIG. 20 will be described in more detail with reference to FIGS. 21 to 23.

Figure 21:
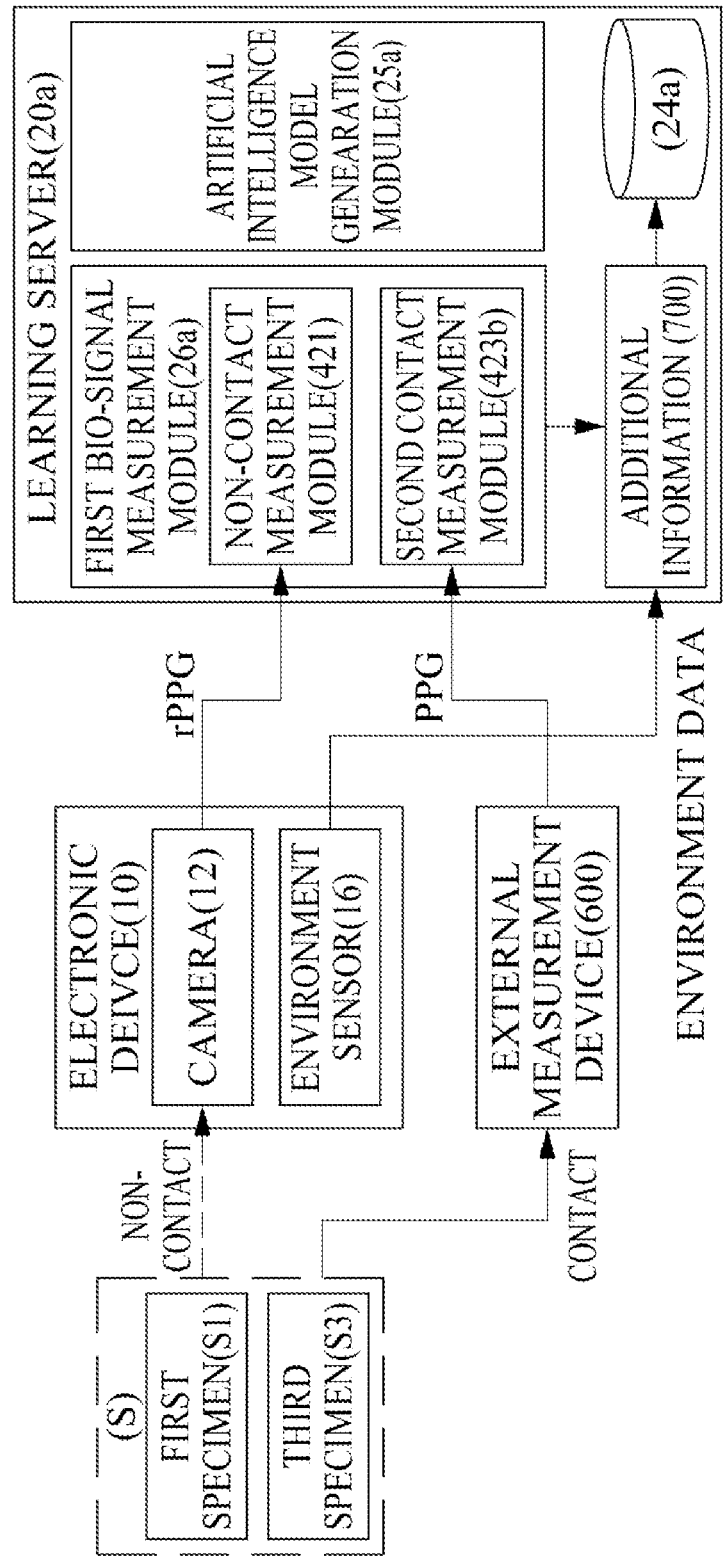
FIG. 21 is a view for explaining an example of an operation using rPPG and PPG for a learning server to generate an artificial intelligence model, according to various embodiments.
Figure 22:
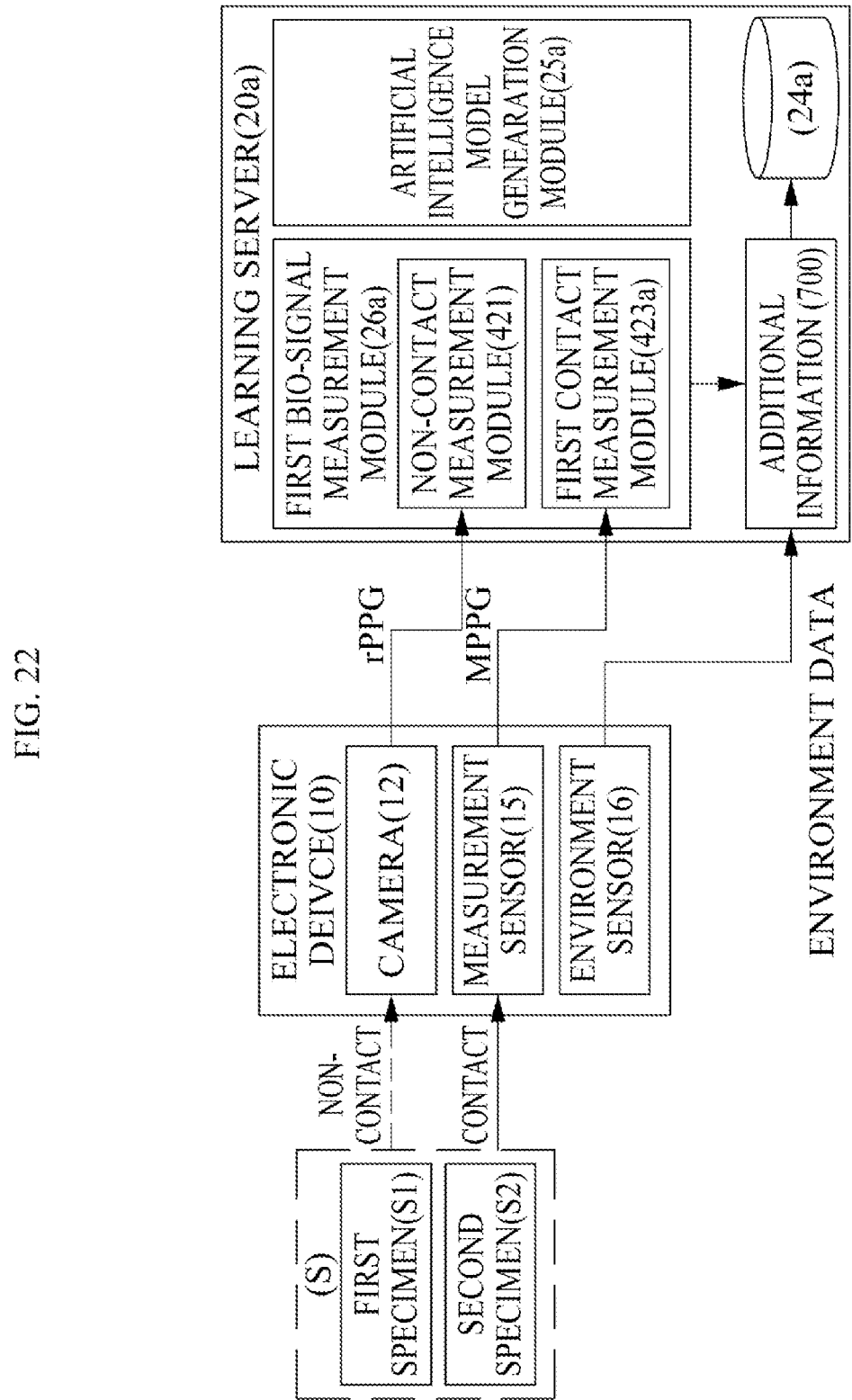
FIG. 22 is a view for explaining an example of an operation using MPPG and PPG for a learning server to generate an artificial intelligence model, according to various embodiments.
Figure 23:
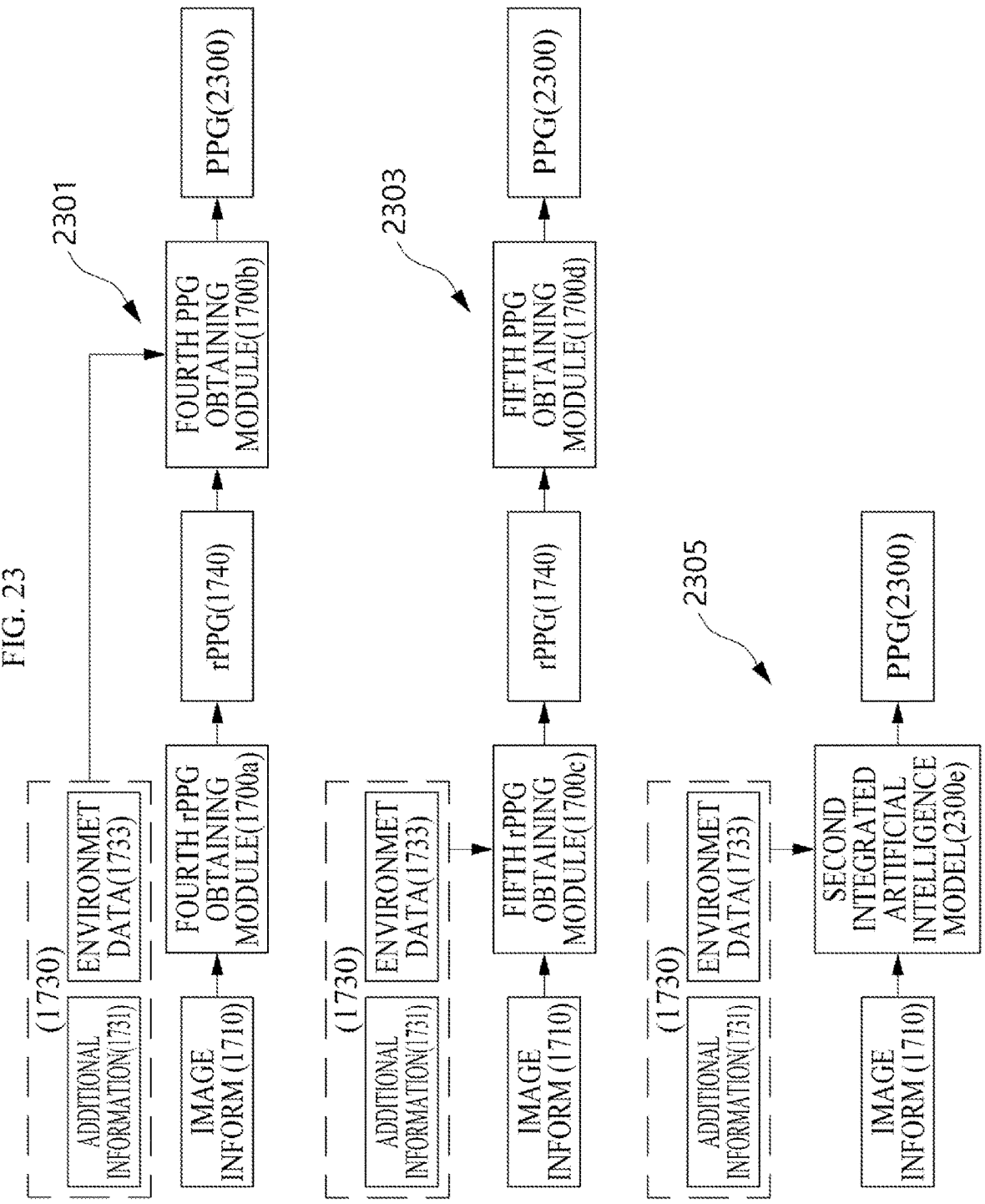
FIG. 23 is a view for explaining an example of at least one artificial intelligence model generated by a learning server, according to various embodiments.

FIG. 21 is a view illustrating an example of an operation of using rPPG and PPG for the learning server 20a to generate an artificial intelligence model according to various embodiments. FIG. 22 is a view illustrating an example of an operation of using MPPG and PPG for the learning server 20a to generate an artificial intelligence model according to various embodiments. FIG. 23 is a view illustrating an example of at least one artificial intelligence model generated by the learning server 20a according to various embodiments.

According to various embodiments, the learning server 20a may obtain a specific type of a first bio-signal based on photographing of a specimen S using the camera 12 of the electronic device 10 in operation 2001, obtain a second bio-signal based on a contact sensor (e.g., the external measurement device 600 and the contact sensor 15) in operation 2003, and obtain the additional learning information in operation 2005. For example, the learning server 20a may obtain the rPPG and the PPG as shown in FIG. 21, or obtain the rPPG and the MPPG as shown in FIG. 22, rather than obtaining all of the rPPG, the PPG, and the MPPG for generating the artificial intelligence model. The redundant descriptions thereof will be omitted.

According to various embodiments, in operation 2007, the learning server 20a may obtain at least one model 2300a, 2300b, 2300c, 2300d, and 2300e for obtaining the specific type of bio-signal based on at least some of the plurality of bio-signals and the additional learning information. For example, the learning server 20a may generate at least one artificial intelligence model implemented to output information on the MPPG or information on the PPG as a result.

In another embodiment, referring to 2301 of FIG. 23, the learning server 20a may be implemented to learn an artificial intelligence model (e.g., a fourth rPPG obtaining model 2300a) for obtaining a non-contact PPG (rPPG) and an artificial intelligence model (e.g., a fourth PPG obtaining model 2300b) for obtaining a PPG (e.g., MPPG or PPG) 2301. For example, the learning server 20a may obtain the fourth rPPG obtaining model 2300a by learning the image information 1710 captured by the camera 12 as input data and the rPPG 1740 as output data among the pieces of information associated with each other stored in the database 24 a. The fourth rPPG obtaining model 2300a may be implemented to output the rPPG 1740 when the image information 1710 is input. Meanwhile, the fourth rPPG obtaining model 2300a may be software and/or algorithms for obtaining a third characteristic value based on the G-R, and the G-B described above with reference to FIG. 9, without being limited to the described examples. For example, the learning server 20a may obtain the fourth PPG obtaining model 2300b by learning the rPPG 1740 and the additional learning information 1730 as input data and the PPG (e.g., MPPG or PPG) 2301 as output data among the pieces of information stored in the database 24 a. The fourth PPG obtaining model 2300b may be implemented to output the PPG (e.g., MPPG or PPG) 2301 when the rPPG 1740 and the additional learning information 1730 (e.g., the additional information 1731, and the environment data 1733) are input. The additional learning information 1730 (e.g., the additional information 1731, and the environment data 1733) may be input to the fourth PPG obtaining model 2300b together with the rPPG 1740 output as the image information 1710 is input to the fourth rPPG obtaining model 2300a to obtain the PPG 2301 (e.g., MPPG or PPG).

In another embodiment, referring to 2303 of FIG. 23, the learning server 20a may be implemented to learn an artificial intelligence model (e.g., a fifth rPPG acquisition model 2300 c) for obtaining non-contact PPG (rPPG) and an artificial intelligence model (e.g., a fifth PPG acquisition model 2300 d) for obtaining the PPG (2301) (e.g., MPPG or PPG). For example, the learning server 20a may obtain the fifth rPPG acquisition model 2300 c by learning the image information 1710 and the additional learning information 1730 captured by the camera 12 as input data and learning the rPPG 1740 as output data among the pieces of information associated with each other stored in the database 24 a. The fifth rPPG acquisition model 2300 c may be implemented to output the rPPG 1740 when the image information 1710 and the additional learning information 1730 (e.g., the additional information 1731, and the environment data 1733) are input. For example, the learning server 20a may obtain the fifth PPG acquisition model 2300 d by learning the rPPG 1740 as input data and the PPG (e.g., MPPG or PPG) (2301) as output data among the information stored in the database 24 a. The fifth PPG acquisition model 2300 d may be implemented to output the PPG (e.g., MPPG or PPG) (2301) when the rPPG 1740 is input. when the rPPG 1740 output by inputting the image information 1710 to the fifth rPPG acquisition model 2300c is input to the fifth PPG acquisition model 2300d, the PPG 2301 (e.g., MPPG or PPG) may be obtained.

According to various embodiments, the learning server 20*a* may learn a single integrated artificial intelligence model (e.g., the second integrated artificial intelligence model 2300*e*) for obtaining PPG. For example, referring to 2305 of FIG. 23, the learning server 20*a* may obtain the second integrated artificial intelligence model 2300*e* by learning the image information 1710, the MPPG 1720, and the additional learning information 1730 as input data and the PPG (e.g., MPPG or PPG) (2301) as output data. The second integrated artificial intelligence model 2300*e* may be implemented to output the PPG (e.g., MPPG or PPG) (2301) when the image information 1710, the MPPG 1720, and the additional learning information 1730 (e.g., the additional information 1731, and the environment data 1733) are input.

Hereinafter, an operation example of providing a bio-signal having similar accuracy to a contact type based on information obtained by using the artificial intelligence model of the electronic device 10 in a non-contact type according to various embodiments will be described. Hereinafter, although the specific type of bio-signal is PPG, the artificial intelligence model for measuring various types of bio-signals may be implemented without being limited to the described example.

Figure 24:
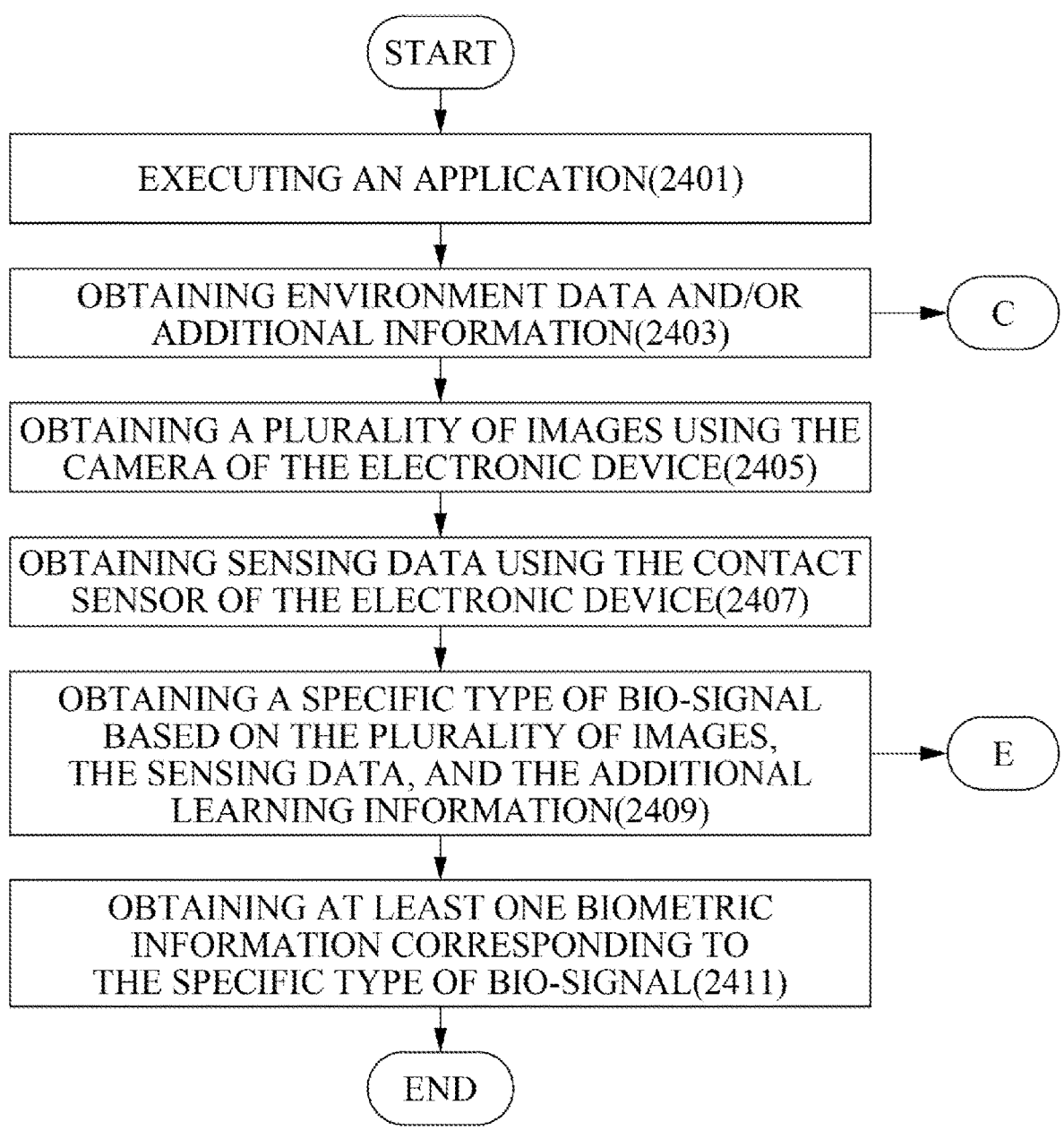
FIG. 24 is a flowchart illustrating an example of an operation of providing a bio-signal a bio-signal having similar accuracy to that of a contact method using an artificial intelligence model of an electronic device, according to various embodiments.

FIG. 24 is a flowchart illustrating an example of an operation of providing a bio-signal a bio-signal having similar accuracy to that of a contact method using an artificial intelligence model of an electronic device, according to various embodiments. Operations may be performed regardless of the order of the operations shown and/or described, and more operations may be performed and/or fewer operations may be performed. Hereinafter, FIG. 24 will be described in more detail with reference to FIG. 25.

Figure 25:
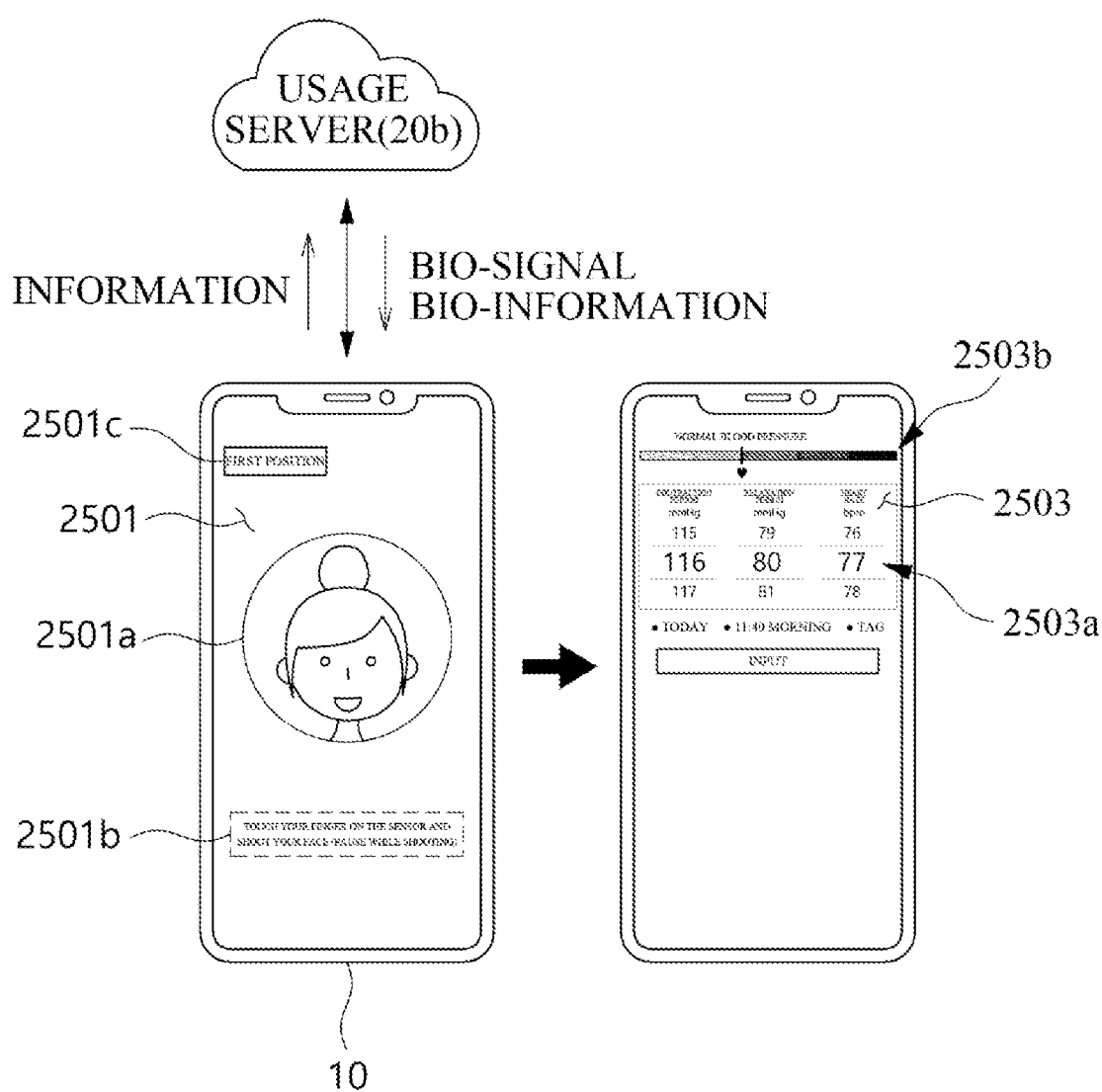
FIG. 25 is a view for explaining an operation of providing a bio-signal having similar accuracy to that of a contact method using an artificial intelligence model of an electronic device, according to various embodiments.

FIG. 25 is a view for explaining an operation of providing a bio-signal a bio-signal having similar accuracy to that of a contact method using an artificial intelligence model of an electronic device 10, according to various embodiments.

According to various embodiments, the electronic device 10 may execute an application in operation 2401. For example, the application may be an application implemented to provide information about a bio-signal having accuracy of a contact type and/or biometric information (e.g., blood pressure, blood sugar, or the like) analyzed based on the bio-signal based on information about a part of a user U (i.e., a specimen) of the user U by acquiring the information about the body part of the user U in a non-contact type.

According to various embodiments, the electronic device 10 may obtain environment data and/or additional information in operation 2403. For example, the electronic device 10 may acquire personal information as the additional learning information. The execution screen of the application for inputting the information about the personal information (e.g., gender, age, age, race, or the like) may be displayed, the characteristic information of the user input through the execution screen may be stored, and/or the execution screen of the application may be transmitted to the server 20 (e.g., the usage server 20*b*). The execution screen of the application may be an execution screen provided when the user subscribes, and/or an execution screen for inputting the personal information of the user. The electronic device 10 may acquire camera information, photographing information, and/or image information as the additional learning information without being limited to the described example.

According to various embodiments, the electronic device 10 may obtain a plurality of images using the camera 12 of the electronic device 10 in operation 2405, and may obtain sensing data using the contact sensor 15 of the electronic device 10 in operation 2407. For example, as shown in FIG. 21, the electronic device 10 may display an execution screen 2501 of an application for guiding the user to make a contact with a part of the body (e.g., a finger) of the contact sensor 15 while photographing the user's face using the camera 12. The execution screen 2501 may include a region 2501*a* in which the user's face is displayed, a region 2501*b* in which text (e.g., "touching a finger and photographing a face on a sensor.") is displayed, and a region 2501*c* in which information about a photographing environment (e.g., distance, position, tilt, illuminance, or the like) about the user's photographing environment (e.g., distance, position, tilt, illuminance, or the like) with respect to the face of the electronic device 10 is displayed. Accordingly, the electronic device 10 may acquire a plurality of images including the user's face using the camera 12, acquire sensing data using the contact sensor 15 disposed on the rear surface, and acquire additional learning information (e.g., environment data and additional information acquired by the environment sensor 16) when photographing. Meanwhile, the electronic device 10 may transmit the obtained information to the server 20 (e.g., the usage server 20*b*).

According to various embodiments, the application may be implemented to have authority to each of the camera 12, the contact sensor 15, and the environment sensor 14 of the electronic device 10 when executed.

According to various embodiments, the electronic device 10 may obtain a specific type of bio-signal based on the plurality of images, the sensing data, and the additional learning information in operation 2409, and obtain at least one biometric information corresponding to the specific type of bio-signal in operation 2411. For example, as described above, the usage server 20*b* may obtain a finally output PPG in response to inputting the received information into at least one learning artificial intelligence model (e.g., the artificial intelligence model 1700*a* to 1700*f* of FIG. 17, the artificial intelligence model 1800*a* to *b* of FIG. 18, and the artificial intelligence model 2300*a* to 2300*e* of FIG. 23). As a result, the PPG may have accuracy of a contact type method. In addition, the usage server 20*b* may obtain body information (e.g., blood pressure and heart rate information) of the user based on the PPG. As a result, the electronic device 10 may receive the information about the PPG and/or the body information (e.g., blood pressure) of the user from the usage server 20*b* and display the information on the execution screen 2503 of the application. For example, the execution screen 2503 may include information 2503*a* about heart rate and information 2503*b* about blood pressure.

Hereinafter, an example of an operation of guiding photographing as at least a part of operation 2403 of the electronic device 10 according to various embodiments will be described.

Figure 26:
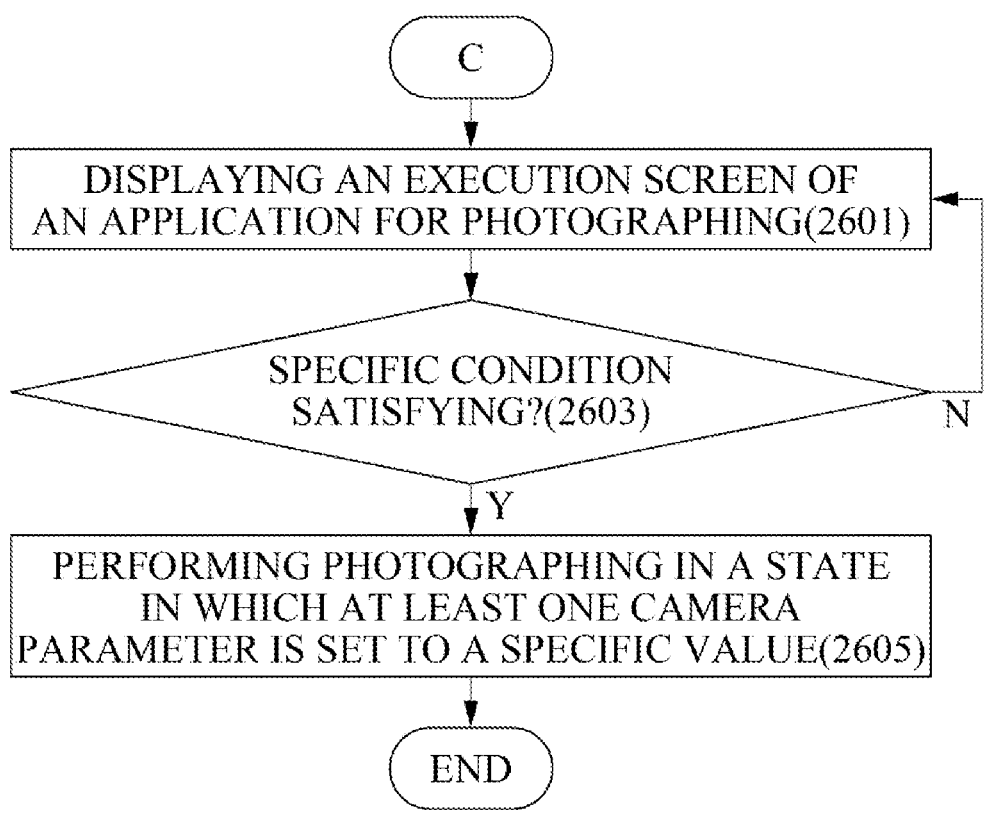
FIG. 26 is a flowchart illustrating an operation of guiding a photographing of an electronic device, according to various embodiments.

FIG. 26 is a flowchart illustrating an operation of guiding photographing of the electronic device 10 according to various embodiments. Operations may be performed regardless of the order of operations shown and/or described, and more operations may be performed and/or fewer operations may be performed. Hereinafter, FIG. 26 will be described in further detail with reference to FIG. 27.

Figure 27:
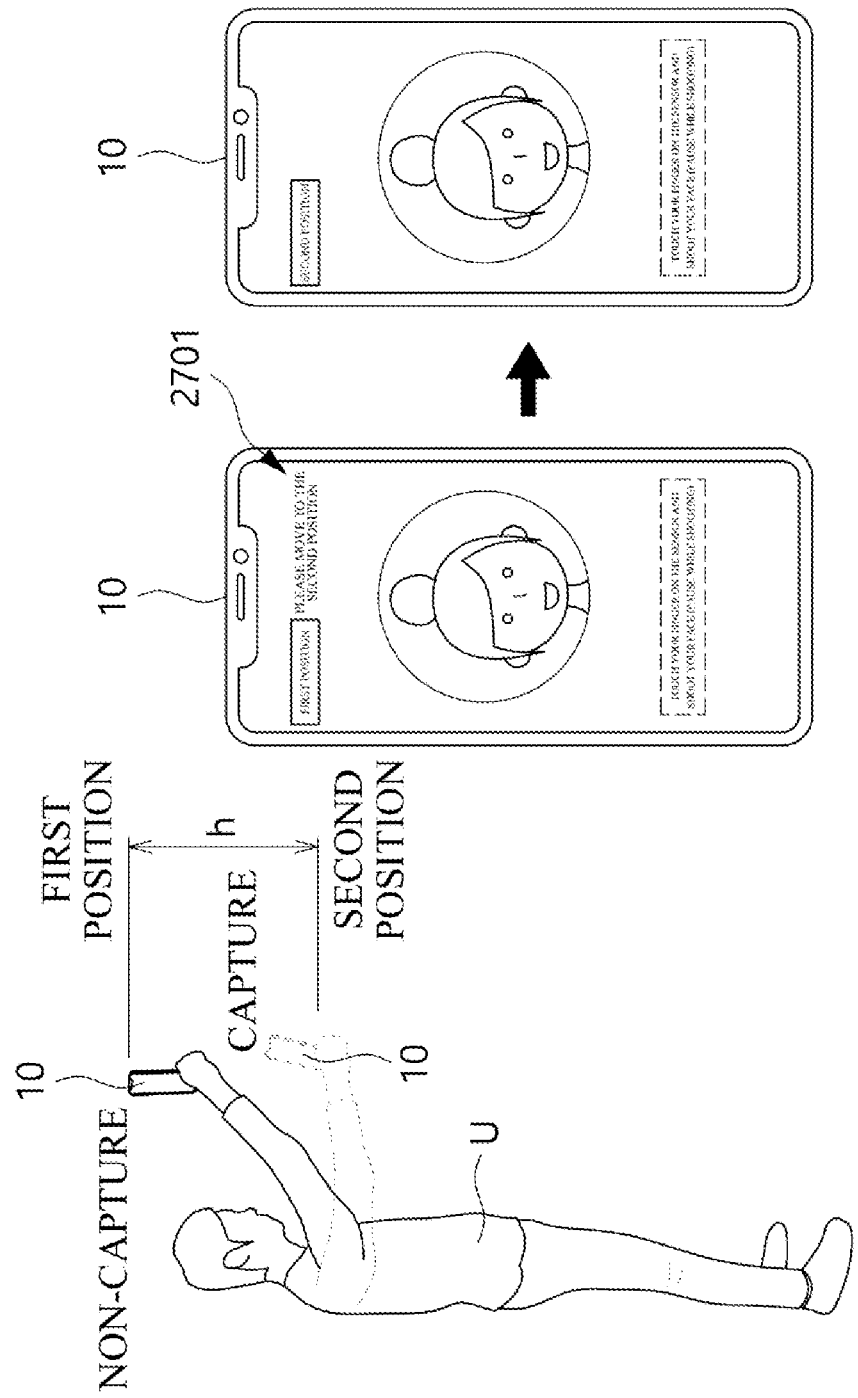
FIG. 27 is a diagram for explaining an example of an operation of guiding shooting of an electronic device, according to various embodiments.

FIG. 27 is a diagram illustrating an example of an operation of guiding photographing of the electronic device 10 according to various embodiments.

According to various embodiments, the electronic device 10 may display an execution screen of an application for photographing in operation 2601. For example, as illustrated in FIG. 27, the electronic device 10 may provide an execution screen 2701 of an application for photographing.

According to various embodiments, the electronic device 10 may determine whether a specific condition is satisfied in operation 2603 and may perform photographing in a state in which at least one camera parameter (e.g., shutter speed, FPS, photographing resolution, or the like) is set to a specific value in operation 2603-Y when the specific condition is satisfied and operation 2605. For example, the electronic device 10 may determine whether information (e.g., illuminance, or the like) associated with a photographed surrounding environment and/or information (e.g., position, tilt, or the like) associated with a state of the electronic device 10 when photographing satisfy a specific condition using the environment sensor 16 of the electronic device 10 as at least a part of an operation of determining that the specific condition is satisfied. For example, as illustrated in FIG. 27, the electronic device 10 may determine whether a position of the electronic device 10 satisfies a specific position (e.g., a second position). When the position of the electronic device 10 is a specific position (e.g., the second position), the electronic device 10 may perform photographing using the camera 12. Accordingly, a deviation of an image obtained in a non-contact manner is reduced, and thus, accuracy of the PPG may be further improved.

According to various embodiments, as illustrated in FIG. 27, the electronic device 10 may update and provide information (e.g., the first position and the second position) about the position on the execution screen 2701 of the application for photographing, thereby enabling the user to recognize.

According to various embodiments, at least one camera parameter (e.g., shutter speed, FPS, or the like) may be set to a specific value during the photographing. For example, the camera parameter may be set so that the video is photographed in a range of 20 to 30 FPS per second.

Hereinafter, an example of an operation of using an artificial intelligence model of the server 20 (e.g., the usage server 20b) according to various embodiments will be described.

Figure 28:
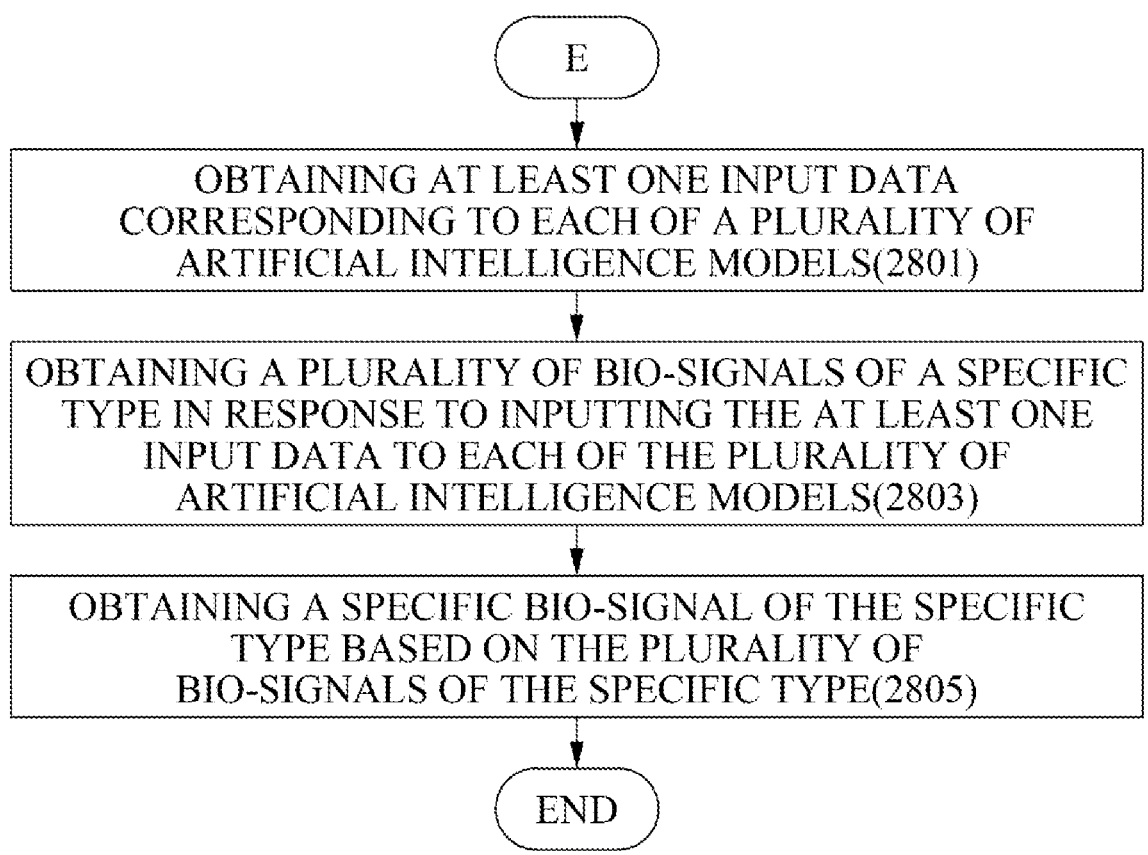
FIG. 28 is a flowchart illustrating an example of an operation of using an artificial intelligence model of a server (e.g., a usage server) according to various embodiments.

FIG. 28 is a flowchart illustrating an example of an operation of using an artificial intelligence model of the server 20 (e.g., the usage server 20b) according to various embodiments. Operations may be performed regardless of the order of the operations shown and/or described, and more operations may be performed and/or fewer operations may be performed. Hereinafter, FIG. 28 will be described in further with reference to FIG. 29.

Figure 29:
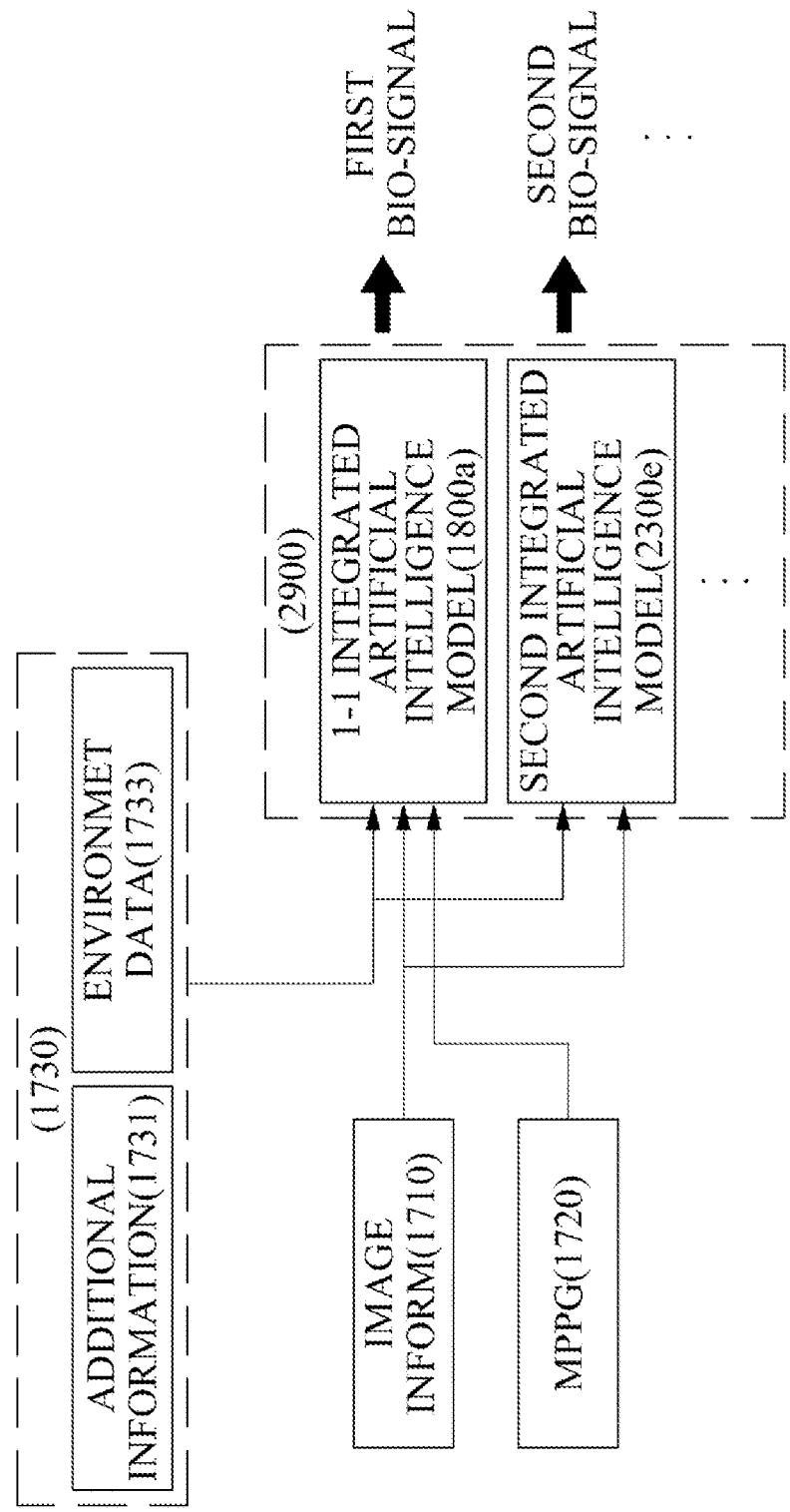
FIG. 29 is a view for explaining an example of an operation using an artificial intelligence model of a server (e.g., a server using a server) according to various embodiments.

FIG. 29 is a diagram illustrating an example of an operation of using an artificial intelligence model of the server 20 (e.g., the usage server 20b) according to various embodiments.

According to various embodiments, the usage server 20b may obtain at least one input data corresponding to each of a plurality of artificial intelligence models in operation 2801, and may obtain a plurality of bio-signals of a specific type in response to inputting the at least one input data to each of the plurality of artificial intelligence models in operation 2803. For example, the usage server 20b may store the above-described learning at least one artificial intelligence model (e.g., the artificial intelligence models 1700a to 1700f of FIG. 17, the artificial intelligence model 1800a to b of FIG. 18, and the artificial intelligence models 2300a to 2300e of FIG. 23). In this case, the usage server 20b may obtain a plurality of PPGs output by inputting input data associated with each artificial intelligence model (e.g., the artificial intelligence models 1700a to 1700f of FIG. 17, the artificial intelligence model 1800a to b of FIG. 18, and the artificial intelligence models 2300a to 2300e) based on the image information 1710, the MPPG 1720, and/or the additional learning information 1730 received from the electronic device 10.

According to various embodiments, the usage server 20b may obtain a specific bio-signal of the specific type based on the plurality of bio-signals of the specific type in operation 2805. In an embodiment, the usage server 20b may select a specific PPG determined to be the highest reliability among the plurality of PPGs, and may provide information and/or body information about the specific PPG to the electronic device 10. In another embodiment, the usage server 20b may obtain information about a specific PPG by performing a predetermined calculation (e.g., averaging) based on the plurality of PPGs, and may provide the information and/or body information about the specific PPG to the electronic device 10. In another embodiment, the utilization server 20b may select a specific PPG output from the artificial intelligence model most suitable for the user among the plurality of PPGs and provide information and/or body information about the specific PPG to the electronic device 10.

What is claimed is:

1. An electronic device comprising:
   a communication circuit; and
   at least one processor, wherein the at least one processor is configured to:
   obtain, via the communication circuit, a plurality of images including a user's face captured using a camera of a mobile terminal of the user,
   obtain, via the communication circuit, photographing information associated with photographing obtained by the mobile terminal while obtaining the plurality of images,
   obtain, via the communication circuit, a first biometric signal indicating photoplethysmography (PPG) based on at least one sensor of the mobile terminal contacting a first finger of a first hand of the user, and a second biometric signal indicating the PPG obtained based on an external electronic device contacting a second finger of a second hand of the user corresponding to the first finger, wherein an accuracy of the second biometric signal is higher than an accuracy of the first biometric signal,
   obtain, via the communication circuit, personal information associated with personal characteristics of the user, and by performing learning using the plurality of images, the photographing information, the first biometric signal, the second biometric signal, and the personal information as training data, obtain at least one artificial intelligence model, wherein the plurality of images, the first biometric signal and the second biometric signal are obtained simultaneously, and wherein the second biometric signal is set as an output data of the training data, and the plurality of images, the photographing information, the first biometric signal, and the personal information are set as an input data of the training data,
   in response to receiving (i) a plurality of first images received from the camera of the mobile terminal, (ii) first photographing information and first personal information received from the mobile terminal, and (iii) the first biometric signal received from the at least one sensor of the mobile terminal, generate an estimation value of the second biometric signal by the at least one artificial intelligence model, and
   determine at least blood pressure of the user by processing the estimation value of the second biometric signal, wherein the at least one artificial intelligence model is implemented to provide the estimated value of the second biometric signal, in response to receiving the plurality of images obtained using the camera of the mobile terminal, the photographing information, the first biometric signal obtained based on the mobile terminal, and the personal information.

2. The electronic device of claim 1, wherein the photographing information includes information associated with a state associated with photographing of the mobile terminal and information associated with an external environment of the mobile terminal.

3. The electronic device of claim 1, wherein the at least one processor is configured to: perform time synchronization of the first biometric signal and the second biometric signal when the learning is performed.

4. The electronic device of claim 3, wherein the at least one processor is configured to: perform time synchronization of the first biometric signal and the second biometric signal with respect to a biometric signal identified based on the plurality of images when the learning is performed.

5. The electronic device of claim 3, wherein the at least one processor is configured to: generate the at least one artificial intelligence model before performing the time synchronization.

6. An operation method of an electronic device, the operation method comprising:
obtaining, via a communication circuit of the electronic device, a plurality of images including a user's face captured using a camera of a mobile terminal of the user;
obtaining, via the communication circuit, photographing information associated with photographing obtained by the mobile terminal while captured the plurality of images;
obtaining, via the communication circuit, a first biometric signal indicating photoplethysmography (PPG) based on at least one sensor of the mobile terminal contacting a first finger of a first hand of the user, and a second biometric signal indicating the PPG based on an external electronic device contacting a second finger of a second hand of the user corresponding to the first finger, wherein an accuracy of the second biometric signal is higher than an accuracy of the first biometric signal;
obtaining, via the communication circuit, personal information associated with personal characteristics of the user;
obtaining at least one artificial intelligence model by performing learning using the plurality of images, the photographing information, the first biometric signal, the second biometric signal, and the personal information as training data, wherein the plurality of images, the first biometric signal and the second biometric signal are obtained simultaneously, and wherein the second biometric signal is set as an output data of the training data, and the plurality of images, the photographic information, the first biometric signal, and the personal information are set as an input data of the training data;
in response to receiving (i) a plurality of first images received from the camera of the mobile terminal, (ii) first photographing information and first personal information received from the mobile terminal, and (iii) the first biometric signal received from the at least one sensor of the mobile terminal, generating an estimation value of the second biometric signal by the at least one artificial intelligence model, and
determining at least blood pressure of the user by processing the estimation value of the second biometric signal,
wherein the at least one artificial intelligence model is implemented to provide the estimated value of the second biometric signal, in response to receiving the plurality of images obtained using the camera of the mobile terminal, the photographing information, the first biometric signal obtained based on the mobile terminal, and the personal information.

7. The method of claim 6, wherein the photographing information includes information associated with a state associated with the photographing of the mobile terminal and information associated with an external environment of the mobile terminal.

* * * * *